United States Patent
Kim et al.

(10) Patent No.: US 12,232,199 B2
(45) Date of Patent: Feb. 18, 2025

(54) TECHNIQUE FOR PERFORMING COMMUNICATION THROUGH MULTI-LINK IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 472 days.

(21) Appl. No.: 17/771,441

(22) PCT Filed: Oct. 19, 2020

(86) PCT No.: PCT/KR2020/014224
§ 371 (c)(1),
(2) Date: Apr. 22, 2022

(87) PCT Pub. No.: WO2021/080265
PCT Pub. Date: Apr. 29, 2021

(65) Prior Publication Data
US 2022/0394795 A1 Dec. 8, 2022

(30) Foreign Application Priority Data
Oct. 23, 2019 (KR) .................. 10-2019-0132530

(51) Int. Cl.
*H04W 76/15* (2018.01)
*H04W 28/02* (2009.01)
*H04W 74/0808* (2024.01)

(52) U.S. Cl.
CPC ....... *H04W 76/15* (2018.02); *H04W 28/0236* (2013.01); *H04W 74/0808* (2013.01)

(58) Field of Classification Search
CPC ............. H04W 76/15; H04W 28/0236; H04W 74/0808; H04W 28/0257; H04W 28/0263;
(Continued)

(56) References Cited

U.S. PATENT DOCUMENTS

2016/0198500 A1\* 7/2016 Merlin ................... H04W 76/11
370/329
2018/0198726 A1\* 7/2018 Baron ................. H04L 47/6215
(Continued)

FOREIGN PATENT DOCUMENTS

KR 20170030759 3/2017

OTHER PUBLICATIONS

Fang, et al., "Multi-Link Architecture and Requirement Discussion", doc.: IEEE 802.11-2019/1095r1, Sep. 2019, 22 pages.

*Primary Examiner* — Afshawn M Towfighi
(74) *Attorney, Agent, or Firm* — LEE, HONG, DEGERMAN, KANG & WAIMEY

(57) ABSTRACT

A receiving STA of a wireless local area network (LAN) system, according to various embodiments, can support a multi-link including a first link and a second link. The receiving STA can request and receive a link for the transmission of low latency traffic. The receiving STA can transmit the low latency traffic on the basis of a first parameter set through a first link that is set as a link for the transmission of low latency traffic.

10 Claims, 28 Drawing Sheets

(a)

(b)

(58) Field of Classification Search
CPC .... H04W 28/0268; H04W 84/12; H04L 1/08; H04L 1/1829
See application file for complete search history.

(56) References Cited

U.S. PATENT DOCUMENTS

| | | | |
|---|---|---|---|
| 2018/0227891 A1* | 8/2018 | Yang | H04W 72/30 |
| 2018/0278697 A1 | 9/2018 | Cariou et al. | |
| 2019/0215884 A1* | 7/2019 | Patil | H04W 74/004 |
| 2020/0296763 A1* | 9/2020 | Lan | H04W 74/04 |
| 2022/0240264 A1* | 7/2022 | Chu | H04W 12/08 |
| 2022/0361193 A1* | 11/2022 | Fang | H04W 4/90 |

* cited by examiner (a)

(b)

TECHNIQUE FOR PERFORMING COMMUNICATION THROUGH MULTI-LINK IN WIRELESS LAN SYSTEM

CROSS-REFERENCE TO RELATED APPLICATIONS

This application is the National Stage filing under 35 U.S.C. 371 of International Application No. PCT/KR2020/014224, filed on Oct. 19, 2020, which claims the benefit of earlier filing date and right of priority to Korean Application No. 10-2019-0132530, filed Oct. 23, 2019, the contents of which are all incorporated by reference herein in their entirety.

BACKGROUND

Field of the Disclosure

This specification relates to a technique for transmitting and receiving data in wireless communication, and more particularly, to a method and apparatus for performing communication through a multi-link in a wireless LAN system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Problem

Recently, as wired/wireless traffic has exploded, time delay-sensitive traffic has also increased significantly. Among the time delay-sensitive traffic, real-time audio/video transmission accounts for a large proportion. According to the proliferation of multimedia devices, the need to support time delay-sensitive traffic even in a wireless environment has increased. However, in a wireless environment rather than a wired environment, since the transmission speed is lower than that of the wired environment and there is a problem of interference from the surroundings, various methods are required to support time delay-sensitive traffic.

In particular, wireless LAN is a communication system that must compete equally in the Industrial Scientific and Medical (ISM) band without a channel monopoly by a central base station. Accordingly, it is relatively more difficult for a wireless LAN to support traffic sensitive to time delay, compared to other communications other than the wireless LAN. Accordingly, in the present specification, a technique for supporting traffic sensitive to time delay may be proposed.

In addition, in the conventional wireless LAN standard, the transmitting STA and the receiving STA operated only on one link. Therefore, in order for the receiving STA to transmit information on the current channel condition to the transmitting STA, the receiving STA has to transmit information on the current channel condition through channel contention on the corresponding channel.

When the receiving STA transmits information on the current channel condition through channel contention, the measured time point and the actual time point at which the value is actually transmitted may be different. In particular, in a congested situation where there are many STAs, the difference may become very large, so that the measured value may not be meaningful.

Technical Solutions

According to various embodiments, a method in a wireless local area network system comprises, requesting, by a receiving STA, which supports a multi-link including a first link and a second link, to a transmitting STA, information on transmission of low-latency traffic, wherein the low-latency traffic includes traffic requiring a time latency less than or equal to a threshold value; receiving, by the receiving STA from the transmitting STA, information on the first link, wherein the information on the first link includes information informing that the first link is assigned as a link for the transmission of the low-latency traffic; and transmitting, by the receiving STA to the transmitting STA, a first frame including the low-latency traffic through the first link, based on a first parameter set for the low-latency traffic.

Technical Effects

According to an embodiment of the present specification, an STA to which the multi-link technology is applied may transmit/receive in a plurality of links, respectively. When transmitting on a specific channel, the STA may additionally provide information on the channel status of another link. Accordingly, the STA can transmit the channel specific value faster than the conventional standard. In addition, according to the embodiment of the present specification, since the STA does not need to transmit a separate packet to transmit information on the channel condition, there is the effect of reducing overhead.

According to an embodiment of the present specification, by setting/allocating one link of the multi-link as a link for low-latency traffic, there is an effect that the overall performance of the BSS is improved.

DETAILED DESCRIPTION

Figure 1:
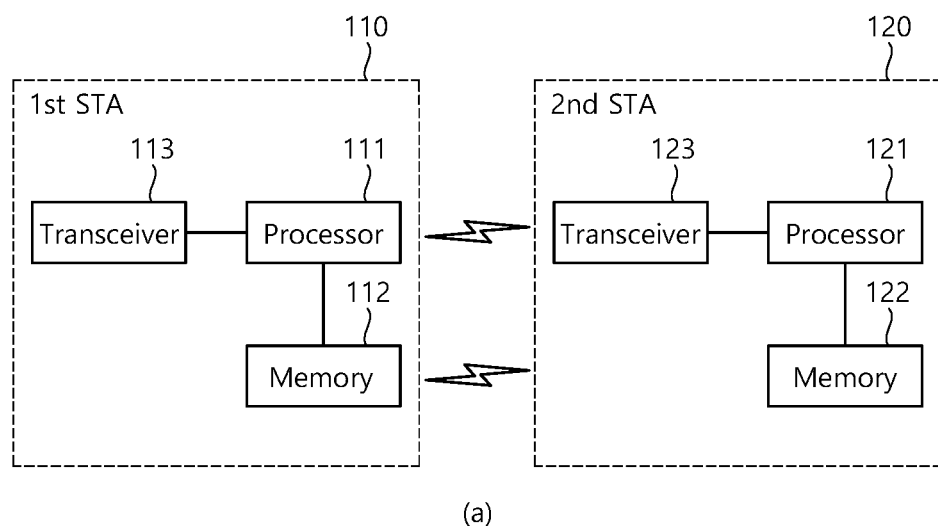
FIG. 1 shows an example of a transmitting apparatus and/or receiving apparatus of the present disclosure.
Figure 1:
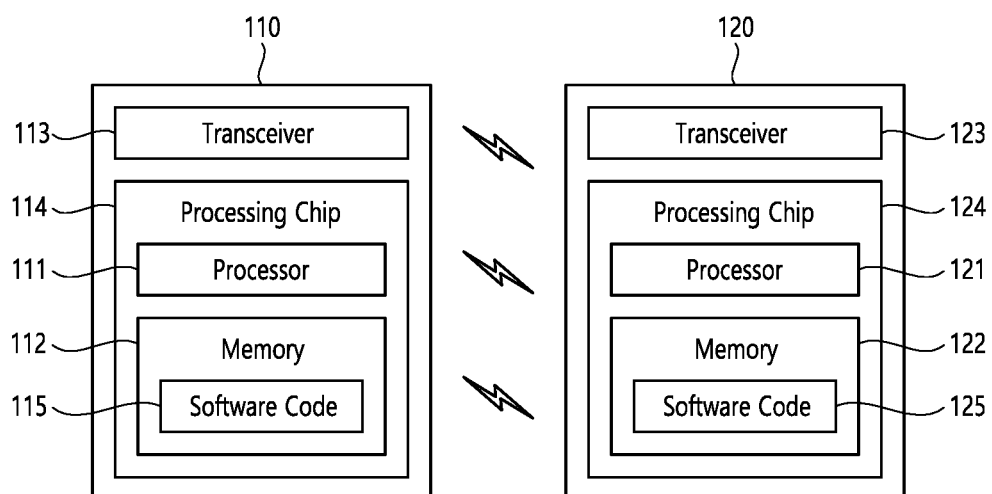

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP', an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
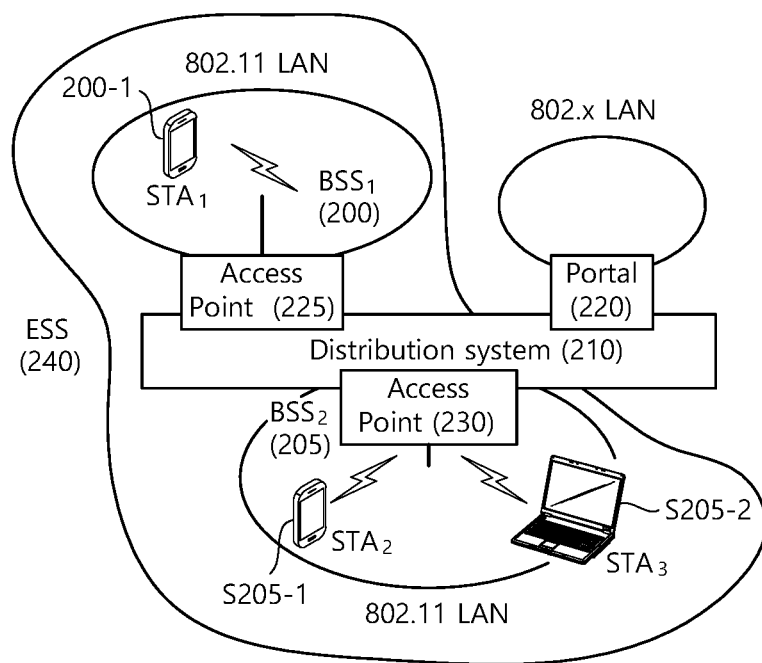
FIG. 2 is a conceptual view illustrating the structure of a wireless local area network (WLAN).
Figure 2:
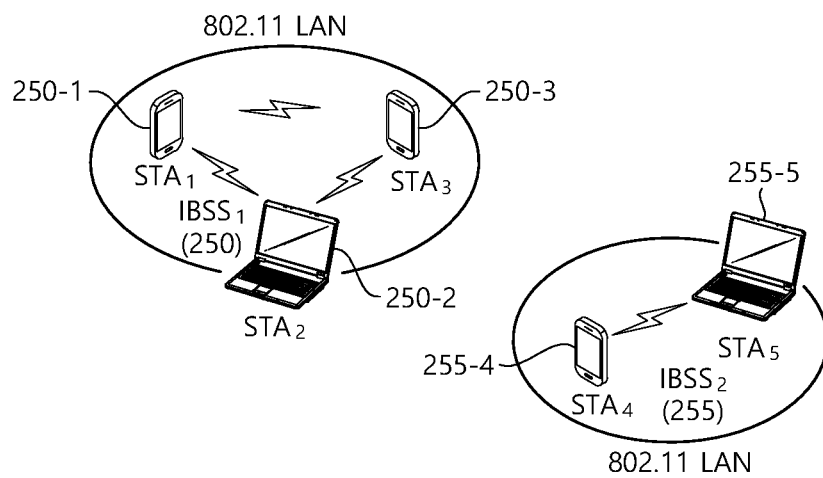

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
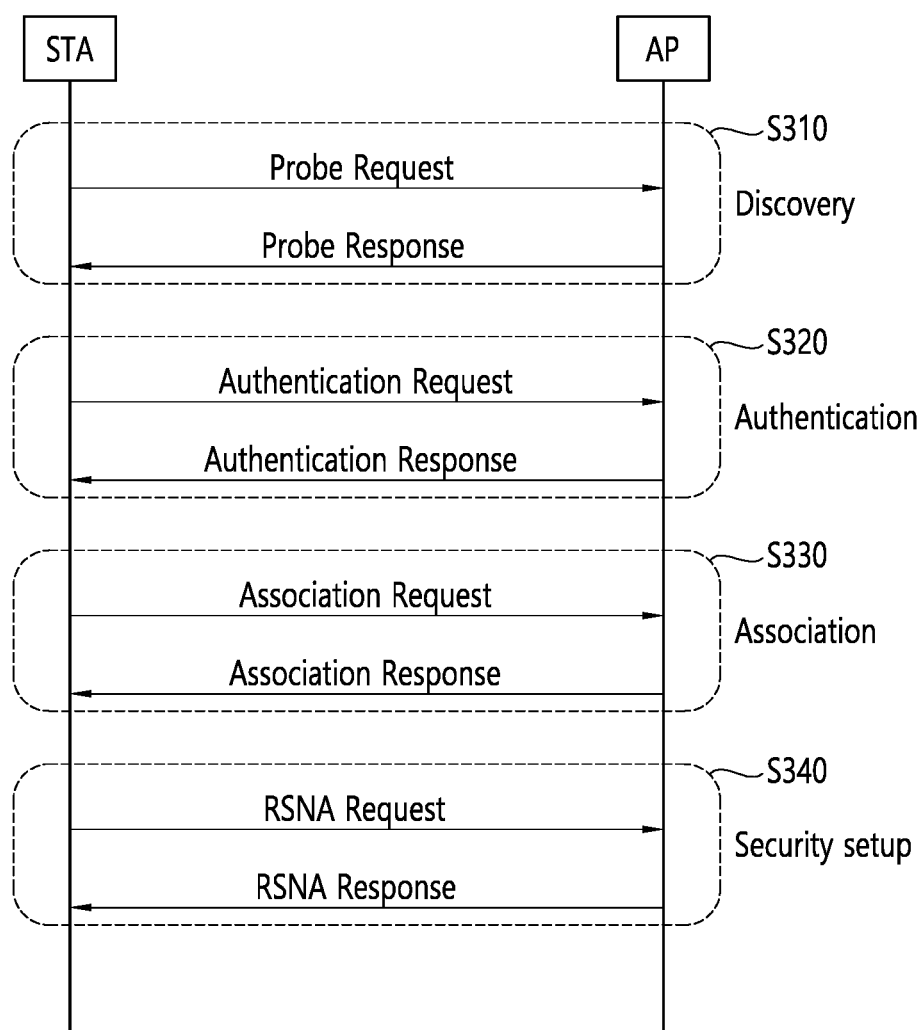
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
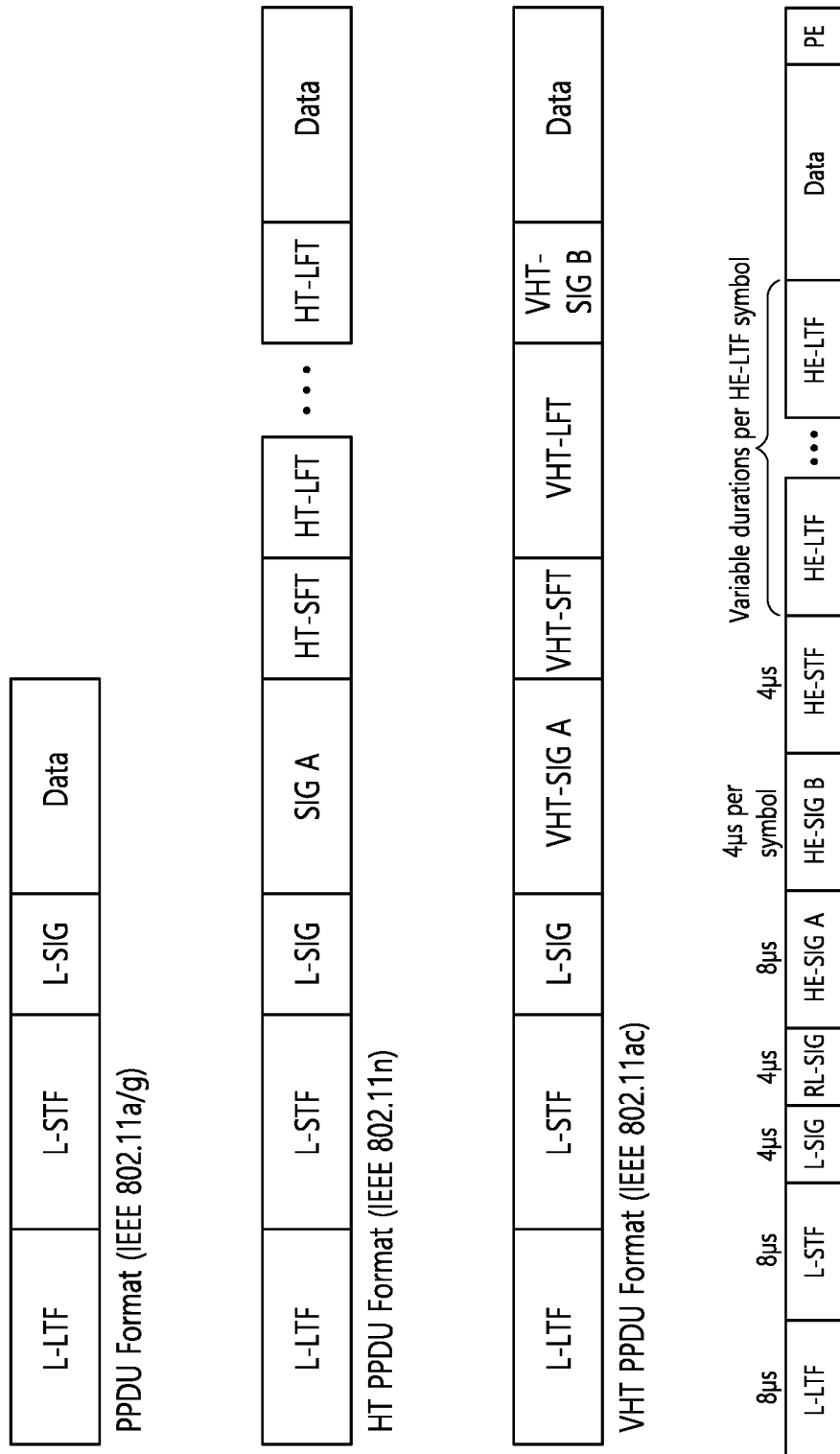
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
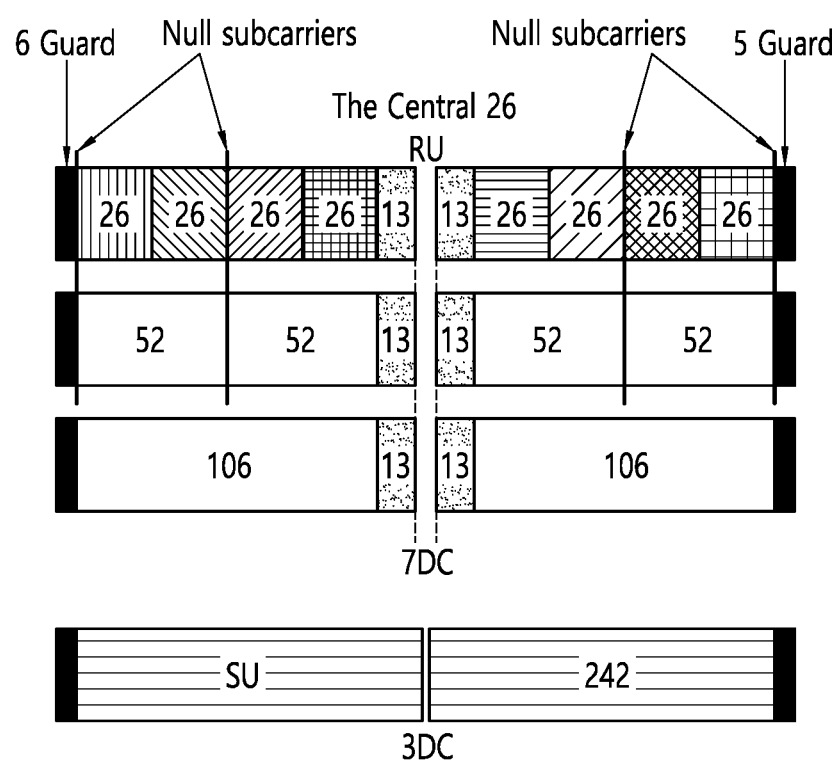
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
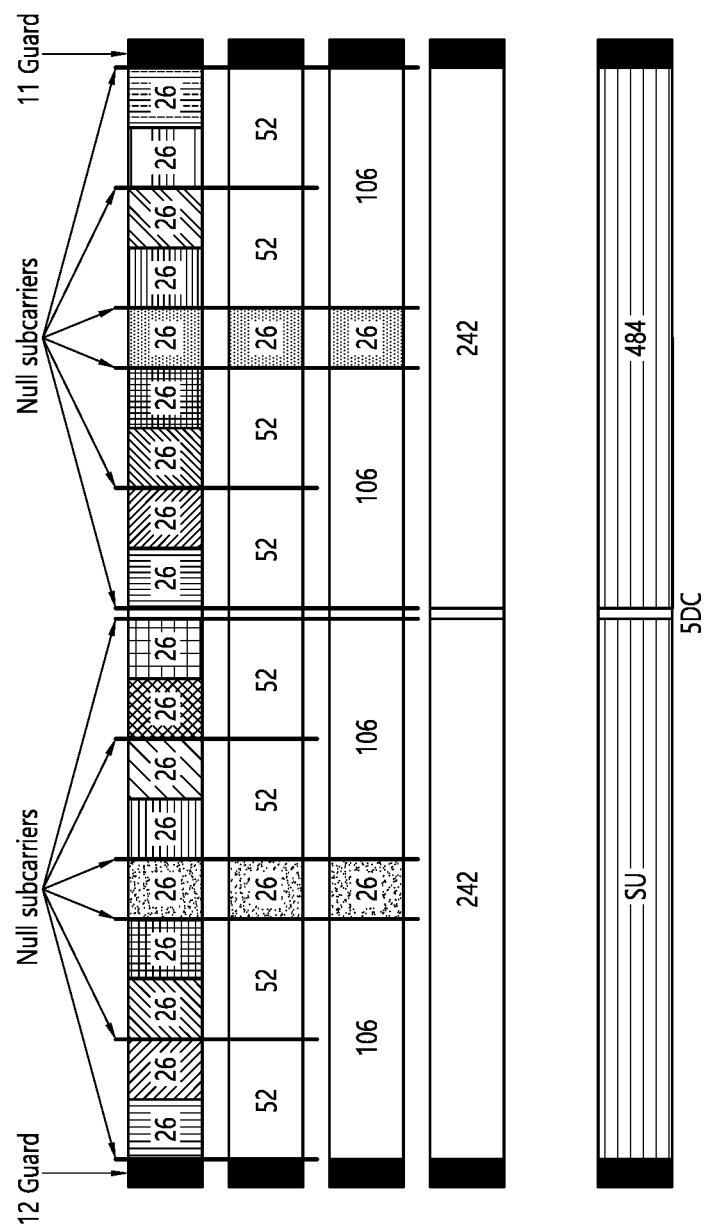
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
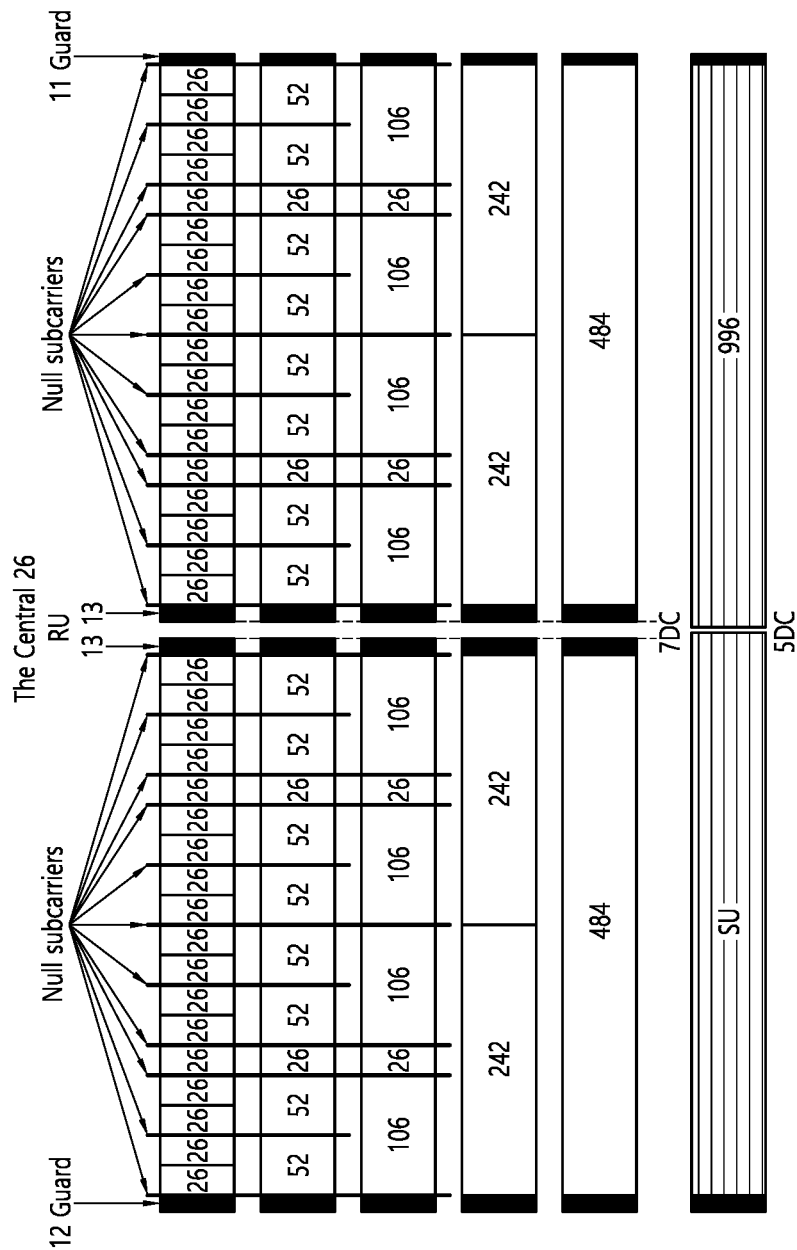
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

In addition, as illustrated, when it is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
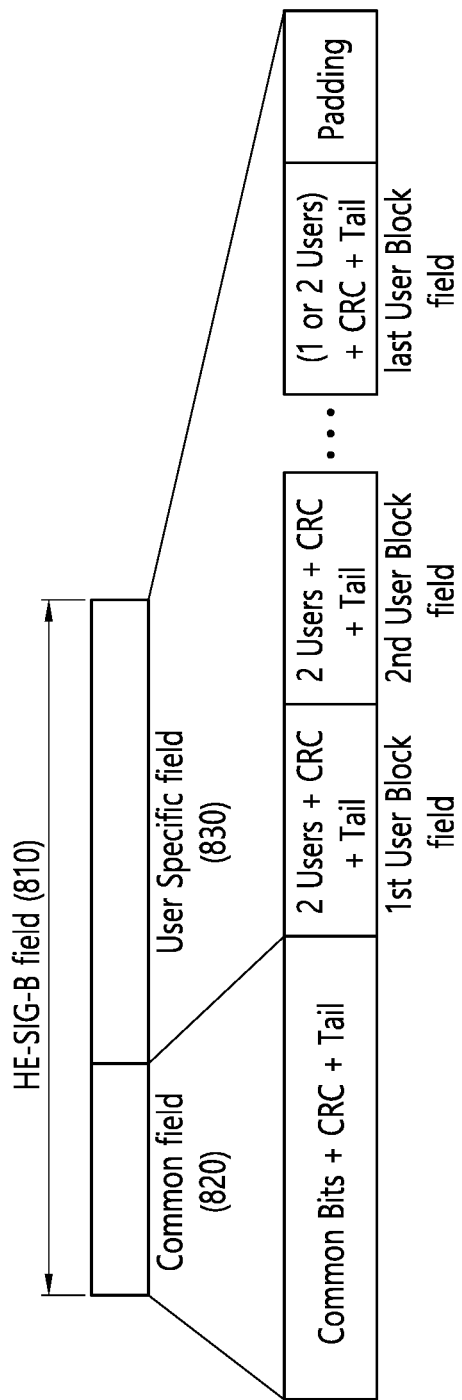
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |    | 1 |
| 00000010 | 26 | 26 | 26 | 26 | 26 | 52 |    | 26 | 26 | 1 |
| 00000011 | 26 | 26 | 26 | 26 | 26 | 52 |    | 52 |    | 1 |
| 00000100 | 26 | 26 | 52 |    | 26 | 26 | 26 | 26 | 26 | 1 |
| 00000101 | 26 | 26 | 52 |    | 26 | 26 | 26 | 52 |    | 1 |
| 00000110 | 26 | 26 | 52 |    | 26 | 52 |    | 26 | 26 | 1 |
| 00000111 | 26 | 26 | 52 |    | 26 | 52 |    | 52 |    | 1 |
| 00001000 | 52 |    | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  | 106 |  |  | 26 | 26 | 26 | 26 | 26 | 8 |
| 01001$y_2y_1y_0$ |  | 106 |  |  | 26 | 26 | 26 | 52 |  | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
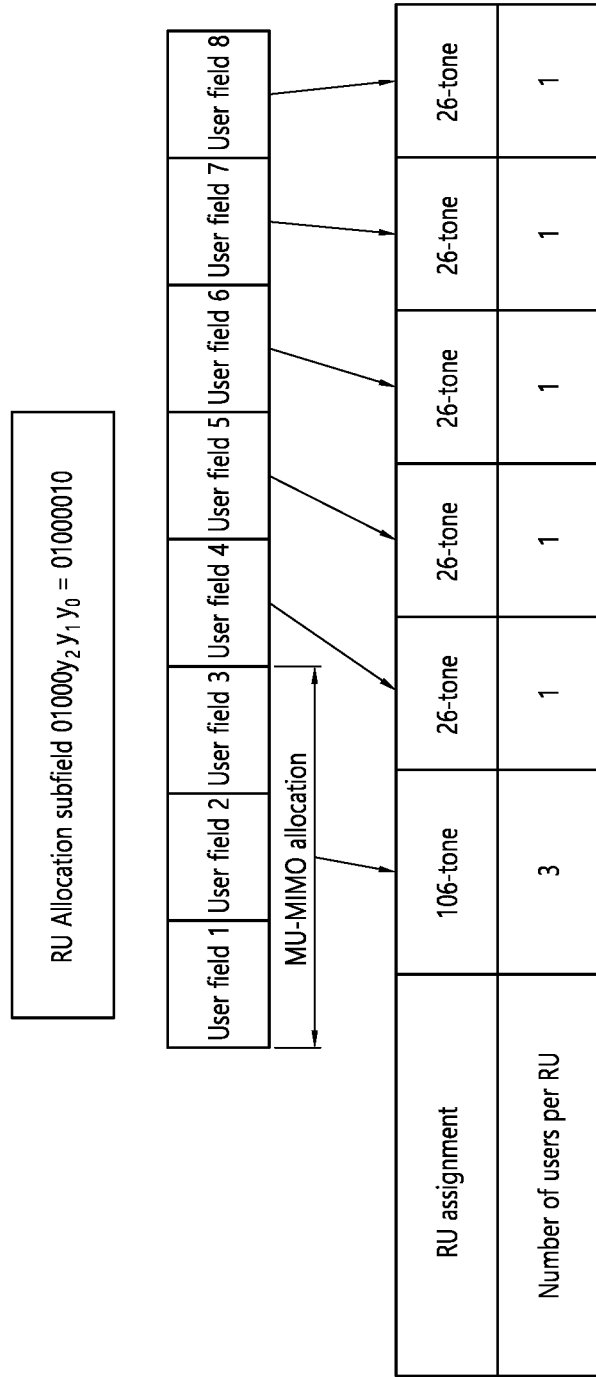
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N STS[1], N STS[2], and N STS[3] may be determined as shown in Table 3. For example, when a value of the second bit (B11-B14) is "0011", it may be set to N STS[1]=4, N STS[2]=1, N STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
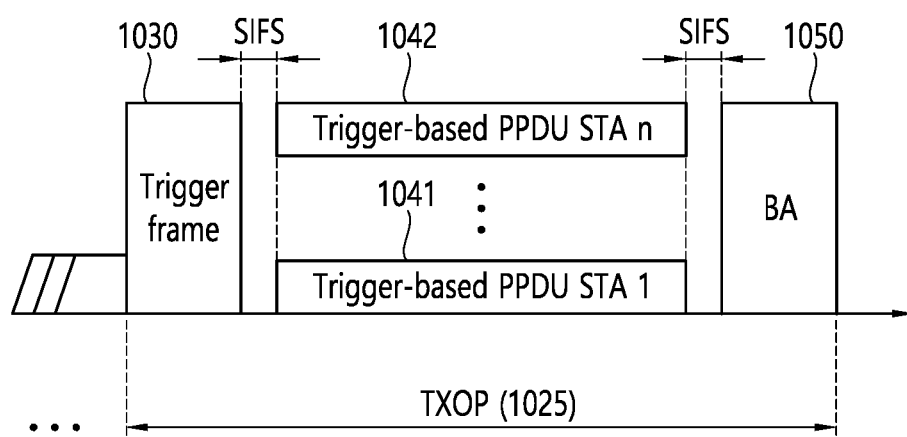
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
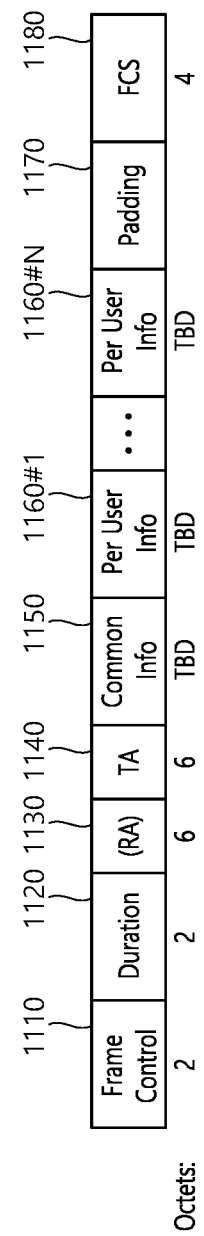
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
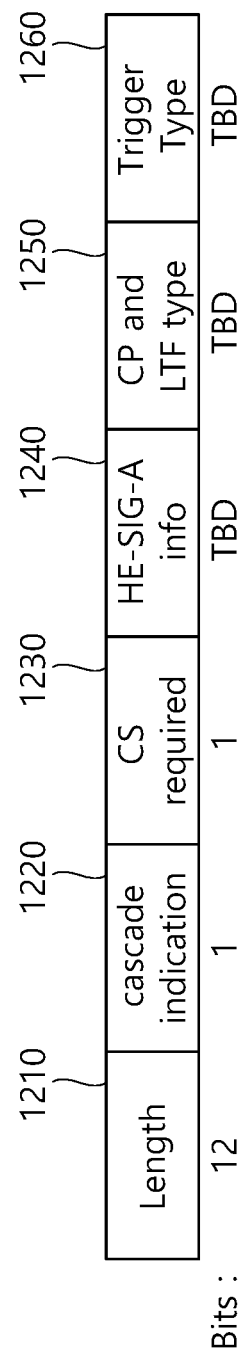
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
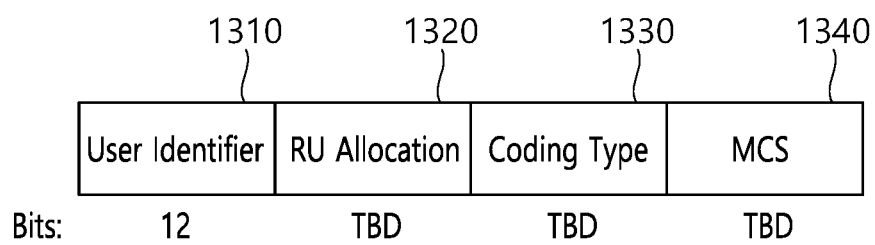
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
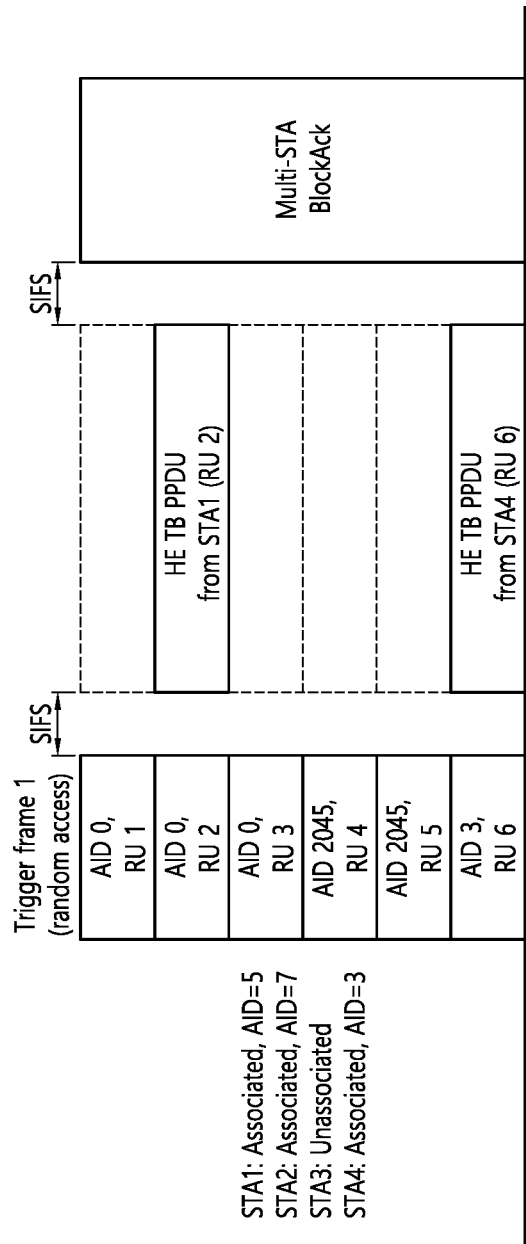
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
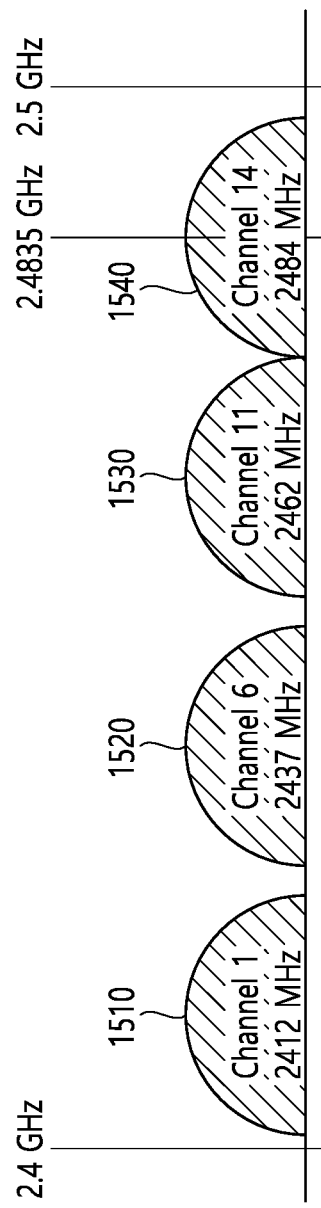
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
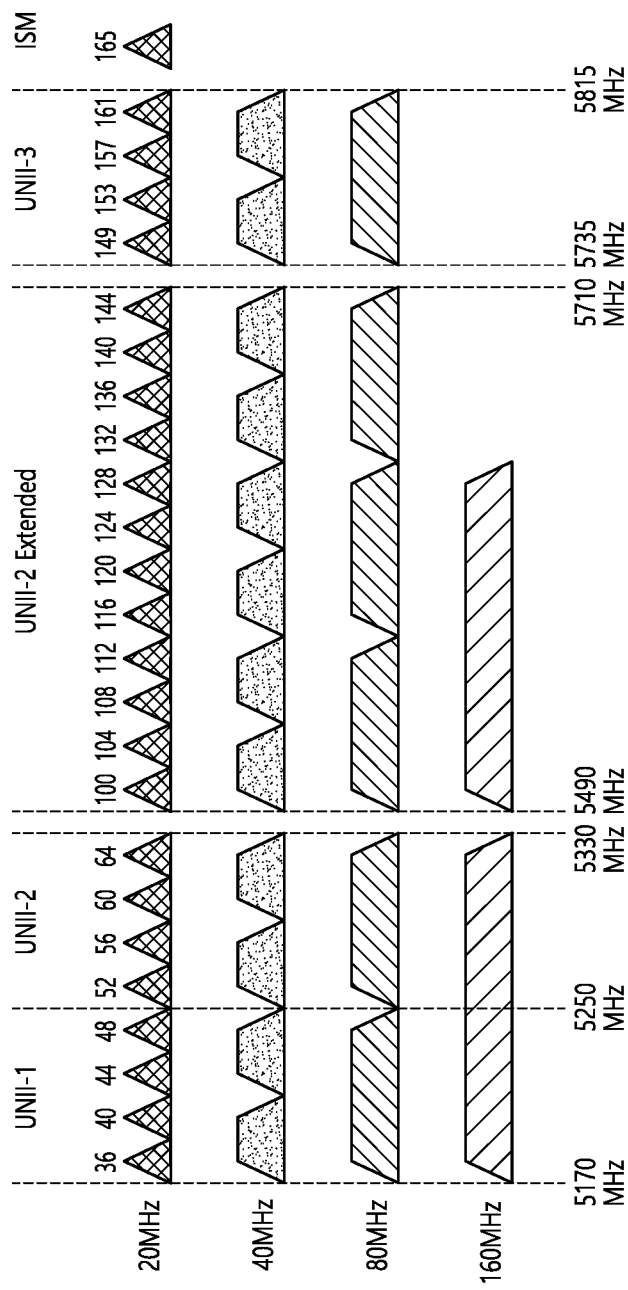
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
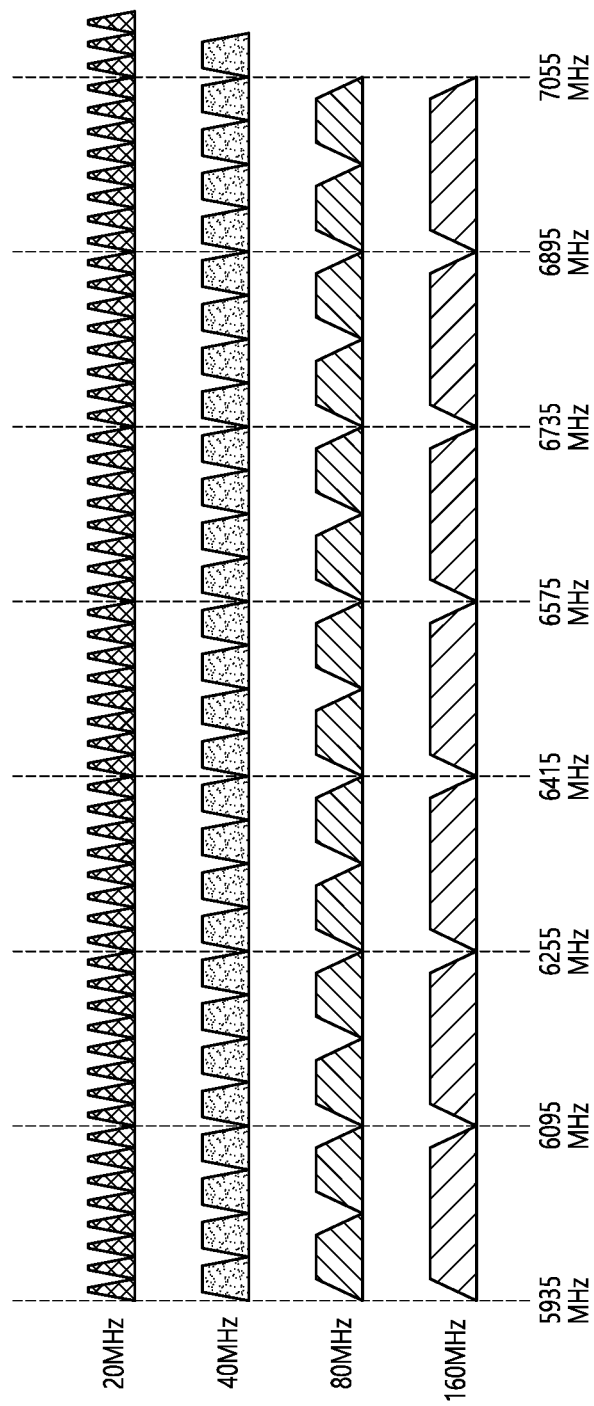
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present disclosure.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) regarding whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \qquad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0 \qquad \text{<Equation 2>}$$

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \qquad \text{<Equation 3>}$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}* \\ (1+j)/\text{sqrt}(2) \qquad \text{<Equation 4>}$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M, \\ 0,-M,-1,M,0,-M,1,-M1\}*(1+j)/\text{sqrt}(2) \qquad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}* \\ (1+j)/\text{sqrt}(2) \qquad \text{<Equation 6>}$$

Equation 7 to Equation 11 below relate to an example of a second type (i.e., 2×STF) sequence.

EHT-STF(−120:8:120)={$M,0,-M$}*(1+$j$)/sqrt(2) <Equation 7>

The EHT-STF for the 40 MHz PPDU may be configured based on the following equation.

EHT-STF(−248:8:248)={$M,-1,-M,0,M,-1,M$1}*(1+$j$)/sqrt(2)

EHT-STF(−248)=0

EHT-STF(248)=0 <Equation 8>

The EHT-STF for the 80 MHz PPDU may be configured based on the following equation.

EHT-STF(−504:8:504)={$M,-1,M,-1,-M,-1,M,0,-M,1,M,1,-M,1,-M$}*(1+$j$)/sqrt(2) <Equation 9>

The EHT-STF for the 160 MHz PPDU may be configured based on the following equation.

EHT-STF(−1016:16:1016)={$M,-1,M,-1,-M,-1,M,0,-M,1,M,1,-M,1,-M,0,-M,1,-M,1,-M,1,M,1,-M,0,-M,1,M,1,-M,1,-M$1}*(1+$j$)/sqrt(2)

EHT-STF(−8)=0,EHT-STF(8)=0,

EHT-STF(−1016)=0,EHT-STF(1016)=0 <Equation 10>

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={$-M,1,-M,1,M,1,-M,0,-M,1,M,1,-M,1,-M$}*(1+$j$)/sqrt(2)

EHT-STF(−504)=0,

EHT-STF(504)=0 <Equation 11>

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BP SK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
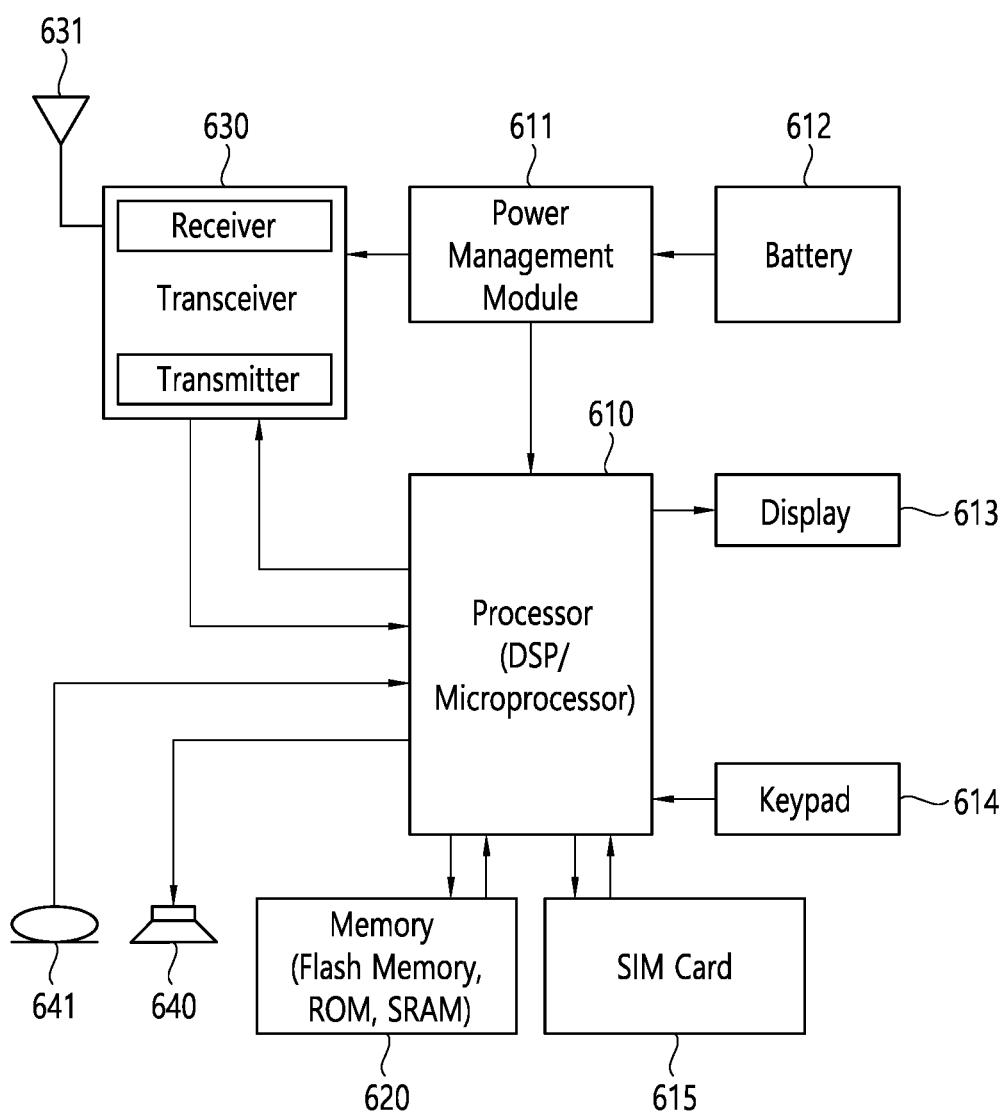
FIG. 19 illustrates an example of a modified transmission device and/or receiving device of the present disclosure.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, the technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
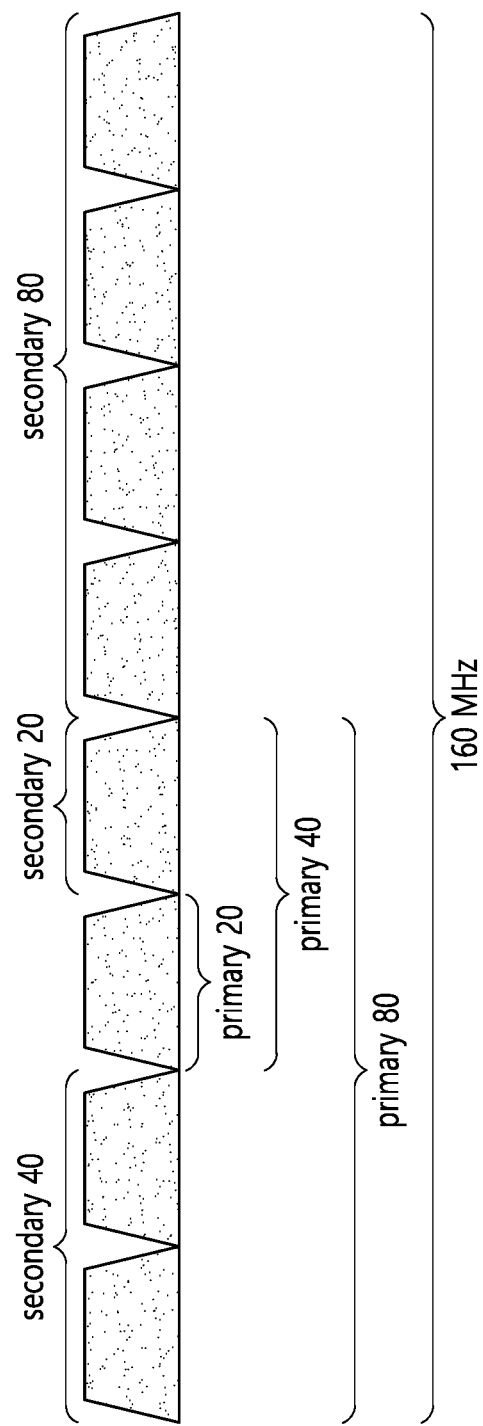
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, the technical features for multi-link and aggregation are described.

An STA (AP and/or non-AP STA) of the present specification may support multi-link communication. That is, the STA may transmit and receive signals simultaneously through the first link and the second link based on the multi-link. That is, the multi-link may refer to a technique in which one STA simultaneously transmits and receives signals through a plurality of links. For example, transmitting a signal through one link and receiving a signal through another link may also be included in multi-link communication. An STA supporting multi-link may use a plurality of links in the first time period and use only one link in the second time period.

Figure 21:
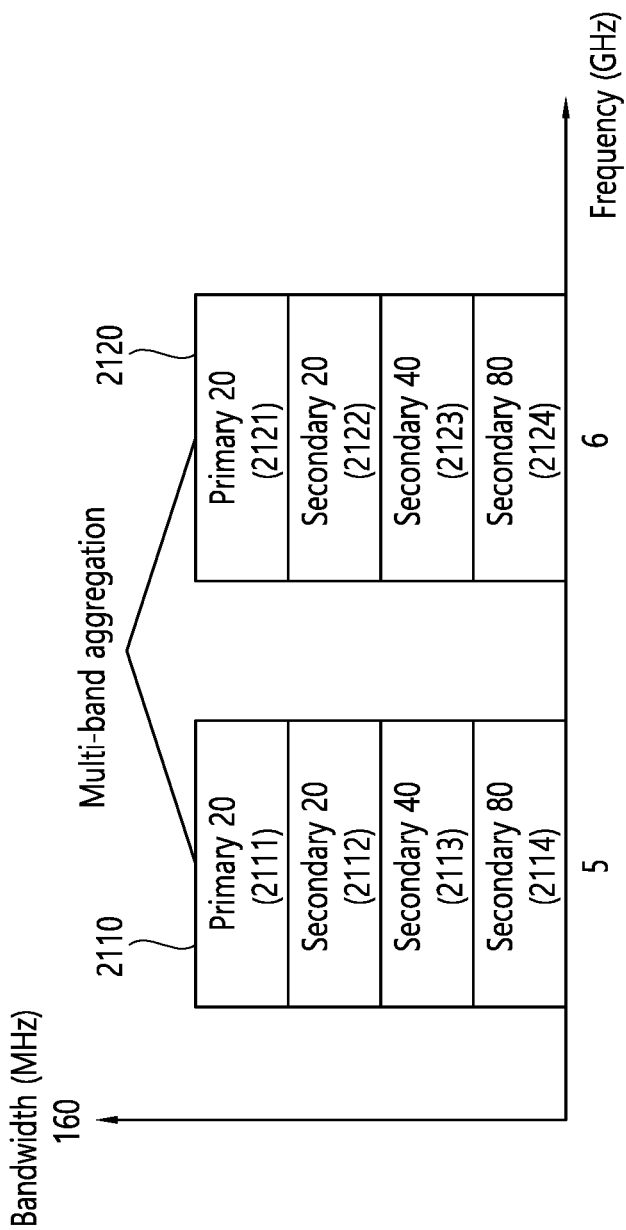
FIG. 21 is a diagram for explaining the technical characteristics of a link used for a multi-link.

FIG. 21 is a diagram for explaining the technical characteristics of a link used for a multi-link.

A link used for a multi-link may have at least one of the following technical characteristics. The link-related features described below are an example, and additional technical features could be applied.

For example, each link used for a multi-link may be included in a different band. That is, when a multi-link supporting the first and second links is used, each of the first link and the second link is included in the 2.4 GHz band, the 5 GHz band, or the 6 GHz band, but the first link and the second link may be included in different bands.

Referring to FIG. 21, a first link 2110 and a second link 2120 may be used for a multi-link. The first link 2110 of FIG. 21 may be included in, for example, a 5 GHz band. The second link 2120 of FIG. 21 may be included in, for example, a 6 GHz band.

Each link used for a multi-link may be included in the same band. For example, when a multi-link supporting the first/second/third link is used, all links may be included in the same band, or the first/second link may be included in the first band and the third link may be included in the second band.

A multi-link may be configured based on different RF modules (for example, IDFT/IFFT blocks). Additionally or alternatively, a plurality of links included in the multi-link may be discontinuous in the frequency domain. That is, a frequency gap may exist in a frequency domain corresponding to the first link and a frequency domain corresponding to the second link among the plurality of links.

As shown in FIG. 21, the first link 2110 may include a plurality of channels 2111, 2112, 2113, and 2114. The STA may apply existing channel bonding to a plurality of channels 2111, 2112, 2113, and 2114. That is, when a plurality of channels 2111, 2112, 2113, and 2114 are idle for a specific time period (for example, during PIFS), a plurality of channels (2111, 2112, 2113, 2114) may be configured as one bonding channel, and one bonding channel may operate as one link 2110. Alternatively, some (for example, 2111, 2112, 2114) of a plurality of channels (2111, 2112, 2113, 2114)

may operate as one link 2110 through the preamble puncturing technique newly proposed in the IEEE 802.11ax standard. The above-described characteristics may be equally applied to the second link 2120.

An upper limit may be set on the number of channels included (and/or maximum bandwidth) in one link used for a multi-link. For example, as in the example of FIG. 21, a maximum of four channels may constitute one link. Additionally or alternatively, the maximum bandwidth of one link may be 160 MHz, 240 MHz, or 320 MHz. Additionally or alternatively, one link may include only contiguous channels. The above specific numbers could be changed.

A procedure for identifying/specifying/determining a link used for a multi-link is related to an aggregation (or channel aggregation) procedure. The STA may perform multi-link communication by aggregating a plurality of links. That is, the STA may perform 1) a first procedure of identifying/specifying/determining a link aggregated for multi-link, and 2) performing a second procedure of performing multi-link communication through the identified/specific/determined link. The STA may perform the first and second procedures as separate procedures, or may simultaneously perform the first and second procedures through one procedure.

Hereinafter, the technical features of the first procedure are described.

The STA may transmit/receive information on a plurality of links constituting a multi-link. For example, the AP may transmit identification information on a band in which multi-link capability is supported and/or identification information on a channel in which multi-link capability is supported, through a Beacon, a Probe Response, an Association Response, or other control frames. For example, when the AP can perform communication by aggregating some channels within the 5 GHz band and some channels within the 6 GHz band, the AP may transmit identification information about an aggregated channel to the user STA.

For example, the user STA may also transmit identification information on a band in which multi-link capability is supported and/or identification information on a channel in which multi-link capability is supported, through a Probe Request, an Association Response, and other control frames. For example, when the user STA can perform communication by aggregating some channels within the 5 GHz band and some channels within the 6 GHz band, the user STA may transmit identification information on the aggregated channels to the AP.

Any one of the plurality of links constituting the multi-link may operate as a primary link. Primary Links can perform various functions. For example, the STA may perform aggregation on another link when the backoff-value of the primary link is 0 (and/or when the primary link is idle during PIFS). Information on such a primary link may also be included in a Beacon, a Probe Request/Response, and an Association Request/Response.

The User-STA/AP may specify/determine/acquire a band and/or a channel on which the multi-link is performed, through a negotiation procedure for exchanging information on their respective capabilities.

For example, the STA may specify/determine/acquire, through a negotiation procedure, a first candidate band/channel that can be used for a first link, a second candidate band/channel that can be used for a second link, and a third candidate band/channel that can be used for a third link.

Thereafter, the STA may perform a procedure of identifying/specifying/determining a link aggregated for multi-link. For example, the STA may aggregate at least two bands/channels, based on the backoff-count and/or the clear channel assessment (CCA) sensing result (Busy/Idle or not) of the first candidate band/channel, the second candidate band/channel, and the third candidate band/channel. For example, when the backoff count value of the first candidate band/channel is 0, the STA may aggregate the second candidate band/channel that has maintained the idle state for a specific period (during PIFS). That is, the STA may determine/specify the first candidate band/channel as the first link for the multi-link, may determine/specify the second candidate band/channel as the second link for the multi-link, and may perform multi-link communication through the first and second links.

Hereinafter, the technical characteristics of the second procedure are described.

For example, when the STA determines to aggregate the first and second links, the STA may perform multi-link communication through the first and second links. For example, the STA may transmit a PPDU of the same length over both the first and second links. Alternatively, the STA receives the transmitting PPDU through the first link, and may receive the receiving PPDU through the second link during the overlapping time period. The STA may perform communication through all aggregated links in a specific time interval, and may use only one link in another time interval.

Hereinafter, the specific operation of the multi-link and technical features for transmitting low-latency traffic in the multi-link can be described.

The multi-link technology (hereinafter, multi-link) may be a technology in which an STA including two or more radio frequency (RF) circuits (or RF units) can transmit/receive independently in each RF circuit. Each RF circuit may perform transmission in a predetermined channel based on contention or resource allocation by a trigger frame. And the data transmitted by each RF circuit may not affect other RFs.

When multi-link is applied, various effects may occur. Hereinafter, an effect according to the multi-link may be described.

For example, when multi-link is used/applied, there is an effect that channels can be used efficiently. In the multi-link, since the RF circuit performs channel contention in each channel, it can only determine whether the channel in which the RF circuit operates is in the Busy/Idle state. Thereafter, when the channel on which the RF circuit operates is in the idle state, data could be transmitted.

For example, when multi-link is used/applied, there is an effect that transmission/reception can be performed simultaneously. For multimedia traffic, the response speed is often important. In addition, since transmission and reception are alternately performed, when multi-link is used/applied, multimedia traffic can be better supported. When multi-link is not used/applied, it may be impossible to receive on another link while transmitting on a specific link.

However, when multi-link is used/applied, implementation complexity may increase. Since each RF circuit can transmit/receive data, a function to manage it on the MAC layer may be additionally required.

Figure 22:
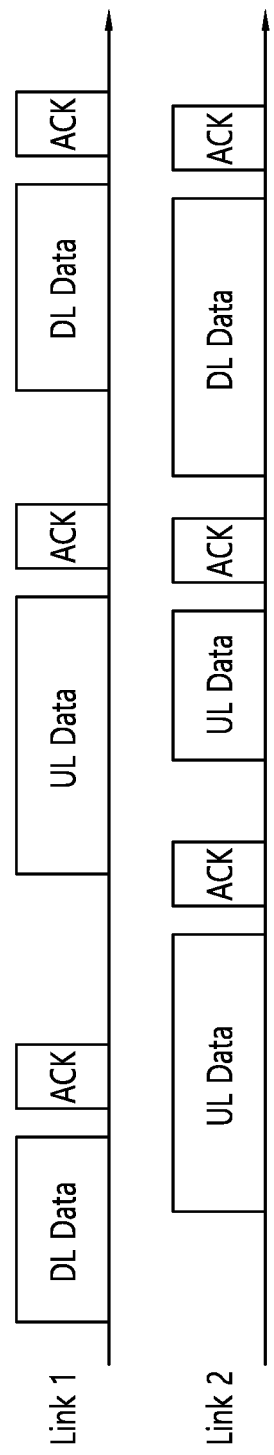
FIG. 22 shows an example of a multi-link operation.

FIG. 22 shows an example of a multi-link operation.

Referring to FIG. 22, an STA may include two RF circuits. The two RF circuits can operate on Link 1 and Link 2 respectively. For example, the first RF circuit may operate in Link 1. The second RF circuit may operate in Link 2.

According to an embodiment, the STA may receive DL data in Link 1 and transmit an ACK. At the same time, the STA may transmit UL data in Link 2 and receive an ACK. That is, the transmission of an uplink frame (for example, UL data) and transmission of a downlink frame (for example, DL data) in Link 1 and Link 2 may be performed, respectively. In other words, signal transmission and reception in Link 1 and Link 2 may be performed independently.

Figure 23:
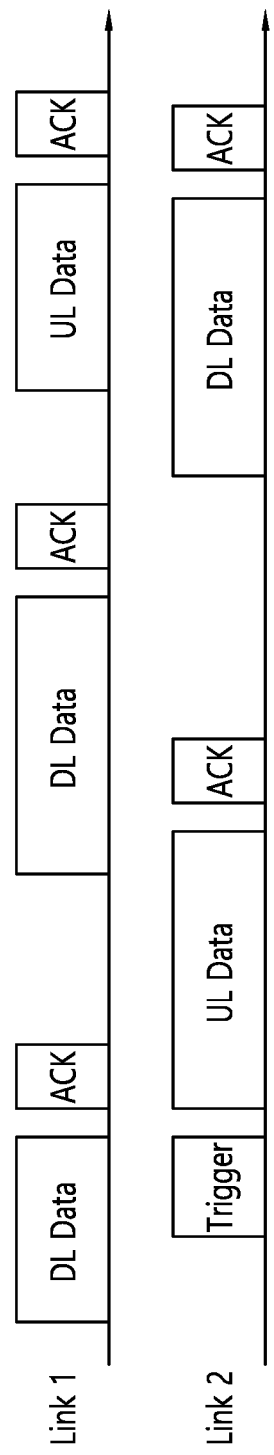
FIG. 23 shows another example of a multi-link operation.

FIG. 23 shows another example of a multi-link operation.

Referring to FIG. 23, EDCA may be prohibited in Link 2. Accordingly, the STA may need to be allocated resources based on the Trigger frame in order to transmit the uplink frame.

In Link 1, the STA may transmit UL data without a trigger frame. For example, in Link 1, the STA may transmit UL data through channel contention. In addition, the STA may transmit/receive UL data in Link 2 based on the Trigger frame.

Hereinafter, a method for performing low-latency communication may be described. Low-latency communication may refer to a technology for supporting time delay-sensitive traffic (hereinafter, low-latency traffic). The time delay may mean latency defined in the IEEE 802.11ax standard.

For example, the time delay (that is, latency) may mean a time from a time point at which a frame is received by the queue of the MAC layer to a time point at which the frame is deleted from the queue of the MAC layer. Specifically, the frame may come into the queue of the MAC layer of the transmitting STA (for example, AP). Thereafter, the frame may be transmitted through the PHY layer of the transmitting STA. The frame may be successfully received by the receiving STA. The transmitting STA may receive an ACK/Block ACK frame, or the like from the receiving STA. The transmitting STA may delete the frame from the queue of the MAC layer. Here, the time delay may mean a time from when a frame is received by the queue of the MAC layer until the frame is deleted from the queue of the MAC layer. Hereinafter, for the convenience of description, the transmitting STA may be referred to as an access point (AP). Also, the receiving STA may be referred to as an STA.

Hereinafter, the present specification may propose various technologies for supporting traffic sensitive to the above-described time delay. In addition, the traffic may include various types of traffic. For example, traffic may be divided into at least two types of traffic. As an example, the first traffic may be traffic sensitive to time delay. The second traffic may be traffic that is not sensitive to time delay. Classification of traffic according to time delay may be only one example, and classification criteria may be set in various ways. For example, the classification criteria may include at least one time delay, whether it is for machine type communication, or importance.

Hereinafter, traffic described in this specification may refer to a type of traffic different from the conventional traffic. For example, the traffic described in the present specification may mean traffic having a new access category (AC) different from the conventional one.

For example, latency traffic (or low-latency traffic) may mean traffic having a different quality of service (QoS) and/or traffic identifier (TID) from the related art. As an example, traffic related to a specific conventional AC (or QoS/TID) may be defined as latency traffic (or low-latency traffic). In addition, the remaining AC (or QoS/TID) may be defined as normal traffic, which is not the latency traffic.

According to an embodiment, latency traffic and normal traffic could have the same AC (or QoS/TID). In addition, latency traffic and normal traffic may be distinguished from each other based on various identification fields (for example, a bit of the PHY preamble and/or a bit of the MAC header).

In the 802.11ax standard, fields indicating the buffer status of the STA are defined in order to inform the AP of the buffer status of the STA. For example, a buffer status report (BSR) Control subfield is defined as one of the variants of the Queue Size subfield included in the QoS Control field and the A-Control subfield included in the HT Control field.

Upon receiving at least some of the fields indicating the buffer status of the STA, the AP may more efficiently allocate UL resources for uplink transmission of the STA. For example, the AP may receive information about the buffer state of the STA connected to the AP. The AP may configure a trigger frame for the STA based on the information on the buffer state of the STA. That is, in the following example, the UL resource for uplink transmission may include a UL resource used for UL MU communication. The STA may perform UL-MU communication through the UL resource allocated by the AP.

In the following specification, when transmitting latency traffic (or low-latency traffic), a technical feature in which multi-links are used may be described. Specifically, there is an effect of reducing the latency through the multi-link. Hereinafter, uplink transmission is assumed, but the embodiments described below may also be applied to downlink transmission.

According to an embodiment, when the STA and the AP support multi-link, one link of the multi-link may be allocated as a link for transmission of low-latency traffic. The operation of the AP and the STA in the link for the transmission of low-latency traffic may be described below.

In the link allocated for low-latency traffic transmission (hereinafter, the first link), the STA and the AP may perform at least one of the following operations.

AP and/or STA can use the EDCA Parameter with priority, when transmitting a frame of low-latency traffic.

(1)-i) For example, the AP may agree to use the first link to transmit low-latency traffic with the STA. In order to transmit low-latency traffic, an STA that has agreed to use the first link may be referred to as a first STA. In order to transmit low-latency traffic, STAs that do not agree to use the first link may be referred to as a second STA. Here, the second STA may transmit traffic other than the low-latency traffic through the first link.

In the first link, when the second STA connected to the AP transmits traffic corresponding to AC_VO, the second STA may use AIFSn=2, CWmin=7, and CWmax=63 as EDCA parameters of AC_VO. On the other hand, to transmit low-latency traffic, when the first STA, which has agreed to use the first link, wants to transmit traffic, the first STA may use AIFSn=1, CWmin=3, and CWmax=7 as EDCA parameters of AC_VO. Accordingly, the first STA may transmit the frame with priority over the second STA.

(1)-ii) Based on the 802.11ax standard, an STA that is allocated an OFDMA UL Resource must use the MU EDCA Parameter, not the EDCA Parameter. In general, the MU EDCA parameter can be used with a larger value than the EDCA parameter. Therefore, when the MU EDCA parameter is used, the rank may be set relatively low when the STA transmits a frame (or signal).

According to an embodiment, when the first STA, which agreed to use the first link to transmit low-latency traffic, transmits low-latency traffic even though OFDMA UL Resource is allocated, the first STA can use EDCA parameters other than MU EDCA parameters. Accordingly, the first STA may perform transmission having priority over the second STA.

MU EDCA Parameter and EDCA Parameter may refer to a set of parameters related to an access category. That is, the MU EDCA Parameter and the EDCA Parameter are not a single value, but may include various values (or parameters) related to AC_VO (voice), AC_VI (video), AC_BE (best effort), and/or AC_BK (background). For example, the EDCA parameter may include values of CWmin, CWmax, AIFSN, and/or TXOP Limit related to AC_VO, AC_VI, AC_BE, and/or AC_BK.

In general, when the MU EDCA parameter is used, the AP may set it to make it more difficult for the STA to obtain a transmission opportunity than when the EDCA parameter is used. Described through a specific example, the third STA may be allocated a UL MU resource based on the trigger frame. The third STA may transmit uplink data based on the UL MU resource. Also, the third STA may transmit uplink data based on channel contention. On the other hand, the fourth STA may give up the UL MU resource allocation. The fourth STA may transmit uplink data only through channel contention.

Since the third STA has more uplink data transmission opportunities than the fourth STA, the AP may set parameters used in the third STA and the fourth STA differently. For example, when the third STA performs the channel access (or channel contention), the AP may set the MU EDCA parameter to be used. The AP may set the EDCA parameter to be used when the fourth STA performs the channel access (or channel contention). Accordingly, by differently setting parameters used for the channel access (or channel contention) by the third STA and the fourth STA, there is an effect of ensuring fairness.

Therefore, according to an embodiment, the first STA, agreeing to use the first link for transmission of low-latency traffic, may use an EDCA Parameter rather than an MU EDCA Parameter when transmitting low-latency traffic even though OFDMA UL Resource is allocated. In general, when the first STA is allocated OFDMA UL Resources, for equality with other STAs, the MU EDCA parameter should be used. However, according to the above-described embodiment, the first STA may use an EDCA parameter instead of an MU EDCA parameter. Since the first STA can transmit with priority, in relation to the transmission of low-latency traffic, there is an effect of improving latency.

(2) OFDMA Resource Unit appropriate for low-latency traffic may be allocated.

For example, UL OFDMA RUs should be frequently allocated for low-latency traffic because the maximum allowable time delay value is short. In addition, in order to prevent an unexpected error or transmission delay, UL OFDMA RUs should be generously allocated even if they are wasted. Such RU allocation may degrade the overall performance of the BSS.

Therefore, for low-latency traffic transmission on the first link only for the first STA, the AP may allocate an OFDMA RU to match the traffic. That is, the AP may limit the degradation of the overall BSS performance to only the first link. Accordingly, the AP may allocate an OFDMA RU in consideration of the overall performance of the BSS in a link other than the first link (that is, the second link).

(3) In the first link between the first STA and the AP, transmission/reception of a management frame other than data transmission may be prohibited. The management frame may be transmitted/received on another link (that is, the second link).

For example, the management frame may be mainly used to transmit information necessary for data transmissions, such as feedback, buffer status report, power saving, and the like. However, the transmission of the management frame itself may waste resources for data frame transmission.

Therefore, according to an embodiment, the Management frame may be transmitted in the second link, the first link may be used only for transmission of low-latency traffic. In this case, there is an effect that latency performance can be improved.

Various methods ((1)-I, (1)-ii, (2), (3)) designed for the low-latency traffic mentioned above can be used in various combinations. That is, a specific method may not be used.

Hereinafter, a specific example in which the first link is allocated as a link for low-latency traffic transmission may be described with reference to FIG. 24.

Figure 24:
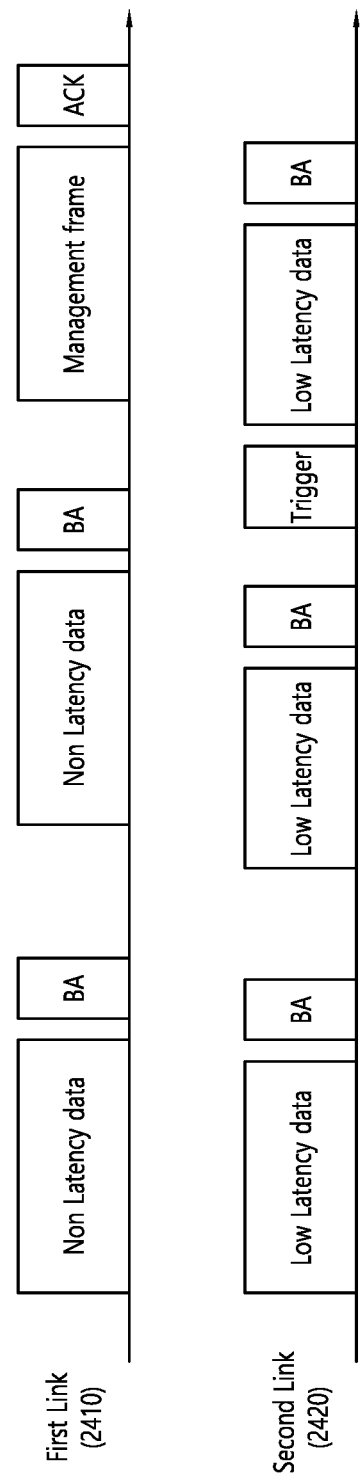
FIG. 24 is a diagram for explaining the operations of an STA and an AP according to various embodiments.

FIG. 24 is a diagram for explaining the operations of an STA and an AP according to various embodiments.

Referring to FIG. 24, an STA and an AP may support multi-link. The multi-link may include a first link 2410 and a second link 2420. The first link 2410 may be assigned to transmit low-latency traffic. The second link 2420 may be used to transmit general traffic.

According to an embodiment, in the first link 2410, the STA may use an EDCA parameter different from the EDCA parameter used in the second link 2420. For example, EDCA parameters may be used in the first link 2410. The MU EDCA parameter may be used in the second link 2420.

According to an embodiment, in the first link 2410, the STA may be allocated a UL resource by a trigger frame.

According to an embodiment, transmission of the management frame in the first link 2410 may be prohibited. Accordingly, the STA and the AP may transmit/receive the management frame for the first link 2410 through the second link 2420. In addition, the STA and the AP may transmit/receive a management frame for the second link 2420 through the second link 2420.

According to an embodiment, the STA and the AP may exchange indication information on a link to be allocated for transmission of low-latency traffic among multi-links in the Probe, Authentication, and Association steps. Based on the above steps, the link to be allocated for the transmission of low-latency traffic may be determined.

For example, the STA may determine/select a link to be used for transmission of low-latency traffic among the multi-link after receiving information about the multi-link in which the current BSS operates from the AP. The STA may transmit information about the determined link to the AP.

For another example, the STA may determine a preferred link as a link to be used for transmission of low-latency traffic among the multi-link after receiving information about the multi-link in which the BSS currently operates from the AP.

According to an embodiment, the AP may determine or change the link or the preferred link determined/selected by the STA as a link for low-latency traffic. The AP may transmit information about the confirmed or changed link to the STA.

According to an embodiment, the STA may not determine/select a link to be used for transmission of low-latency traffic. The AP may determine an appropriate link based on the current BSS situation, and transmit information about the determined link to the STA.

Hereinafter, operations of the AP and the STA according to various embodiments may be described.

Figure 25:
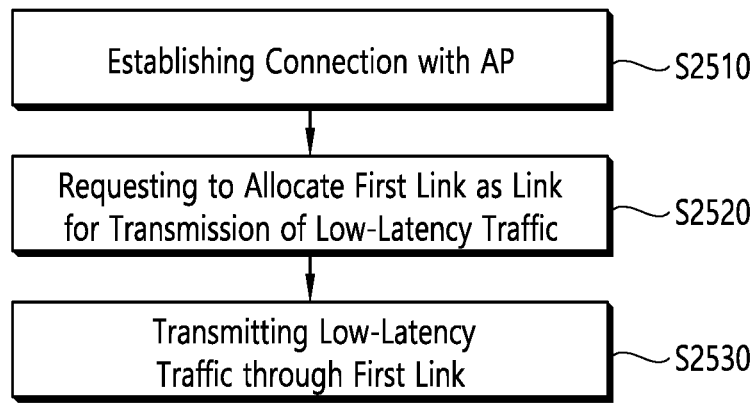
FIG. 25 is a flowchart illustrating an operation of an STA according to various embodiments.

FIG. 25 is a flowchart illustrating an operation of an STA according to various embodiments.

Referring to FIG. 25, in step S2510, the STA may establish a connection with the AP. The STA may establish a connection with the AP based on steps S310 to S340 shown in FIG. 3. For example, the STA and the AP may support multi-link. For example, the STA and the AP may transmit/ receive a frame through a first link and a second link. Also, the first link and the second link may operate independently of each other.

In step S2520, the STA may request the AP to allocate the first link as a link for transmission of low-latency traffic.

According to an embodiment, the STA may request to allocate the first link, among the first link and the second link, as a link for transmission of low-latency traffic.

According to an embodiment, the STA may transmit link indication information (that is, indication information about the first link) to the AP for transmission of low-latency traffic. For example, the STA may transmit link indication information for transmission of low-latency traffic to the AP based on the MAC Payload of the PPDU. In other words, the MAC Payload of the PPDU may include link indication information for transmission of low-latency traffic.

For another example, the STA may transmit link indication information for transmission of low-latency traffic to the AP based on the MAC header of the PPDU. In other words, the MAC header of the PPDU may include link indication information for transmission of low-latency traffic.

According to an embodiment, the STA may perform a channel connection in order to transmit a frame (or PPDU) including link indication information for transmission of low-latency traffic, and the like to the AP.

According to an embodiment, the STA may exchange link indication information for transmission of low-latency traffic with the AP. As an example, the STA may receive information about the multi-link in which the current BSS operates from the AP. The STA may determine/select the first link as a link to be used for transmission of low-latency traffic among multi-links. The STA may transmit indication information related to the first link to the AP. The indication information about the first link may include information for requesting to allocate the first link as a link for the transmission of low-latency traffic.

As another example, the STA may receive information about the multi-link in which the current BSS operates from the AP. The STA may transmit information indicating that the first link is preferred as a link for transmission of low-latency traffic to the AP.

According to an embodiment, the STA may receive information informing that the first link is determined/selected/allocated as a link for transmission of low-latency traffic from the AP.

In step S2530, the STA may transmit low-latency traffic through the first link. The STA may transmit low-latency traffic through the first link determined/selected/allocated as a link for transmission of low-latency traffic.

According to an embodiment, the first link may be prohibited from transmitting/receiving a management frame. The STA may transmit/receive a management frame through the second link.

According to an embodiment, the STA may transmit low-latency traffic to the AP through the EDCA connection. For example, the STA may determine whether the radio channel (that is, the first link) maintains an Idle state during AIFS configured for low-latency traffic. If the wireless channel is maintained in the idle state during AIFS configured for low-latency traffic, the STA may perform a back-off (BO) operation based on a contention window (CW) configured for low-latency traffic.

According to an embodiment, when receiving low-latency traffic through the UL-MU connection, the STA may be allocated time/frequency/spatial resources for UL-MU communication based on previously exchanged information. For example, the information exchanged in advance may include link indication information for transmission of low-latency traffic (that is, indication information about the first link). For example, the STA may be allocated a time/frequency/space resource suitable for low-latency traffic based on the trigger frame. In other words, the trigger frame may include information about time/frequency/space resources suitable for low-latency traffic. The trigger frame may be related to the trigger frame shown in FIG. 11. In addition, the STA may be allocated a UL resource based on the UORA technique shown in FIG. 14.

Although not shown in FIG. 25, the STA may transmit capability information regarding whether to support low-latency traffic to the AP. That is, the STA may transmit information on whether low-latency traffic is supported through a beacon, a probe request frame, a probe response frame, an association request frame, an association response frame, other management frames, or other control frames.

Additionally or alternatively, the STA may transmit "capability information on whether to support link indication information for transmission of low-latency traffic" to the AP. "Capability information on whether to support link indication information for transmission of low-latency traffic" may mean information about whether link indication information for transmission of low-latency traffic can be reported to the AP according to the example described above. The STA may transmit "capability information on whether to support link indication information for transmission of low-latency traffic" through a beacon, a probe request, a probe response, an association request, an association response, other management frames, or other control frames, etc.

Figure 26:
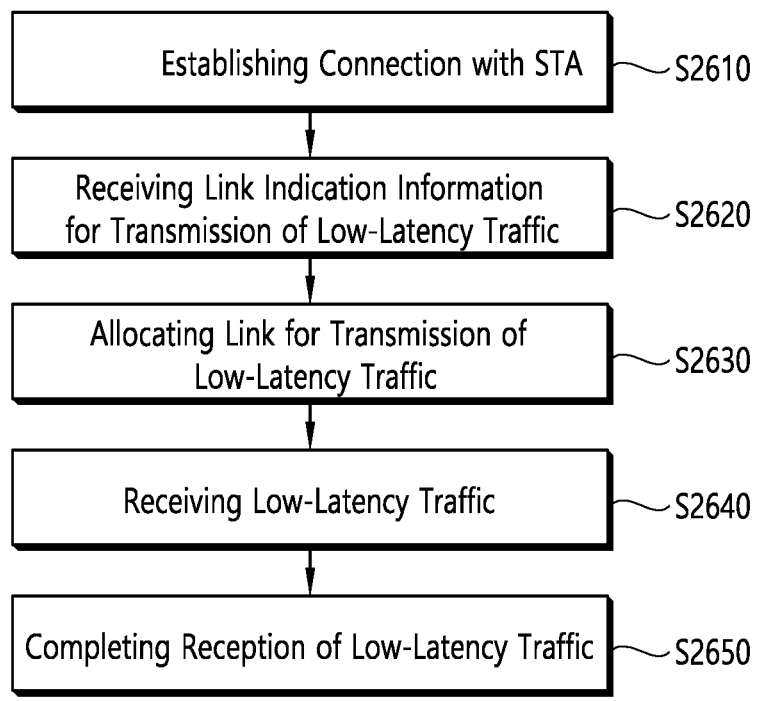
FIG. 26 is a flowchart illustrating an operation of an AP according to various embodiments of the present disclosure.

FIG. 26 is a flowchart illustrating an operation of an AP according to various embodiments of the present disclosure.

Referring to FIG. 26, in step S2610, the AP may establish a connection with the STA. The STA may establish a connection with the AP based on steps S310 to S340 shown in FIG. 3. For example, the STA and the AP may support multi-link. For example, the STA and the AP may transmit/receive a frame through a first link and a second link. Also, the first link and the second link may operate independently of each other.

In step S2620, the AP may receive link indication information for transmission of low-latency traffic. Link indication information for transmission of low-latency traffic may include information (or a signal) for requesting to allocate one of the multi-link links as a link for transmission of low-latency traffic.

According to an embodiment, the AP may receive information (or signal) for requesting to allocate the first link, among the first link and the second link, as a link for transmission of low-latency traffic from the STA.

According to an embodiment, the AP may receive link indication information for transmission of low-latency traffic (that is, indication information for the first link) from the STA. For example, the AP may receive link indication information for transmission of low-latency traffic from the STA, based on the MAC Payload of the PPDU. In other words, the MAC Payload of the PPDU may include link indication information for transmission of low-latency traffic.

For another example, the AP may receive link indication information for transmission of low-latency traffic from the STA based on the MAC header of the PPDU. In other words, the MAC header of the PPDU may include link indication information for transmission of low-latency traffic.

According to an embodiment, the STA may perform a channel connection in order to transmit a PPDU including link indication information for transmission of low-latency traffic, and the like, to the AP. That is, the AP may receive the PPDU received through the channel connection from the STA. The PPDU may include link indication information and the like for transmission of low-latency traffic.

According to an embodiment, the AP may exchange link indication information for transmission of low-latency traffic with the STA. As an example, the AP may transmit information about the multi-link in which the current BSS operates to the STA. The STA may determine/select the first link as a link to use for transmission of low-latency traffic among multi-link (that is, the first link and the second link). The AP may receive indication information about the first link from the STA. The indication information about the first link may include information for requesting to allocate the first link as a link for the transmission of low-latency traffic.

As another example, the AP may transmit information about the multi-link in which the current BSS operates to the STA. The AP may receive information indicating that the first link is preferred as a link to be used for transmission of low-latency traffic from the STA.

In step S2630, the AP may allocate a link for the transmission of low-latency traffic. According to an embodiment, the AP may allocate one of the multi-link as a link for transmission of low-latency traffic based on the link indication information for transmission of low-latency traffic received from the STA.

For example, the AP may allocate the first link, among the first link and the second link, as a link for transmission of low-latency traffic based on the indication information about the first link received from the STA. The indication information about the first link may include information for requesting to allocate the first link as a link for the transmission of low-latency traffic.

For example, based on the information indicating that the first link is preferred as the link for the transmission of low-latency traffic, the AP may allocates the first link, among the first link and the second link, as a link for the transmission of low-latency traffic.

According to an embodiment, the AP may transmit information informing that the first link is determined/selected/allocated as a link for transmission of low-latency traffic to the STA.

In step S2640, the AP may receive low-latency traffic (or data) from the STA.

According to an embodiment, the AP may transmit low-latency traffic through a link determined/selected/allocated as a link for transmission of low-latency traffic. For example, the AP may transmit low-latency traffic through the first link determined/selected/allocated as a link for transmission of low-latency traffic.

According to an embodiment, the STA may transmit low-latency traffic to the AP through the EDCA connection. That is, the AP may receive, from the STA, the low-latency traffic transmitted through the EDCA connection. For example, the STA may determine whether the radio channel (that is, the first link) maintains an Idle state during AIFS configured for low-latency traffic. If the wireless channel is maintained in the idle state during AIFS configured for low-latency traffic, the STA may perform a back-off (BO) operation based on a contention window (CW) configured for low-latency traffic.

According to an embodiment, when receiving low-latency traffic through the UL-MU connection, the AP may allocate time/frequency/spatial resources for UL-MU communication to the STA based on the information exchanged in advance. For example, the information exchanged in advance may include indication information about a link (that is, the first link) for transmission of low-latency traffic. For example, the AP may allocate time/frequency/space resources suitable for low-latency traffic based on the trigger frame. In other words, the trigger frame may include information about time/frequency/space resources suitable for low-latency traffic. The trigger frame may be related to the trigger frame shown in FIG. 11. In addition, the STA may be allocated a UL resource based on the UORA technique shown in FIG. 14.

According to an embodiment, the first link may be prohibited from transmitting/receiving a management frame. The AP may transmit/receive a management frame through the second link.

In step S2650, the AP may complete the reception of low-latency traffic (or data) from the STA. According to an embodiment, the AP may change a link for transmission of low-latency traffic to a link for transmission of normal traffic. According to an embodiment, the AP may maintain a link allocated as a link for transmission of low-latency traffic. Thereafter, the AP may receive low-latency traffic from the second STA through the link assigned as a link for transmission of low-latency traffic.

Although not shown in FIG. 26, the AP may transmit capability information regarding whether to support low-latency traffic to the STA. That is, the AP may transmit information on whether low-latency traffic is supported through a beacon, a probe request frame, a probe response frame, an association request frame, an association response frame, other management frames, or other control frames.

Additionally or alternatively, the AP may transmit "capability information on whether to support link indication information for transmission of low-latency traffic" to the STA. "Capability information on whether to support link indication information for transmission of low-latency traffic" may mean information about whether link indication information for transmission of low-latency traffic can be reported to the AP according to the example described above. The AP may transmit "capability information on whether to support link indication information for transmission of low-latency traffic" through a beacon, a probe request, a probe response, an association request, an association response, other management frames, other control frames, or the like.

Figure 27:
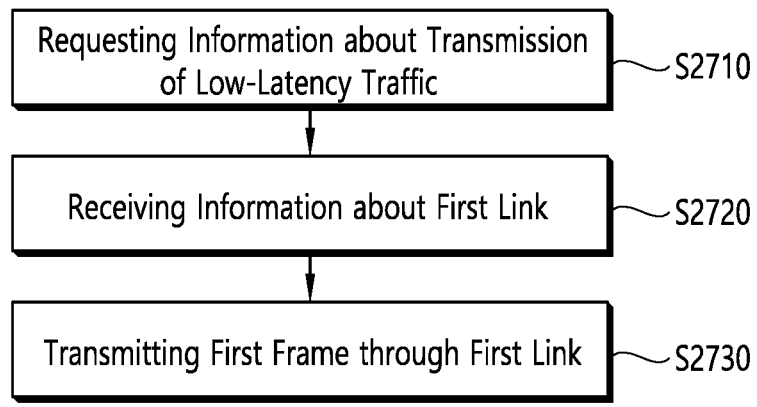
FIG. 27 is a flowchart illustrating an operation of a receiving STA according to various embodiments of the present disclosure.

FIG. 27 is a flowchart illustrating an operation of a receiving STA according to various embodiments of the present disclosure.

Referring to FIG. 27, in step S2710, the receiving STA may request information about the transmission of low-latency traffic to the transmitting STA.

According to an embodiment, the receiving STA and the transmitting STA may support a multi-link including a first link and a second link. For example, the receiving STA and the transmitting STA may transmit/receive data through the first link and the second link. Also, the first link and the second link may operate independently of each other. For example, the receiving STA may transmit uplink data through the second link while receiving downlink data through the first link.

According to an embodiment, the low-latency traffic may include traffic requiring a time delay less than or equal to a threshold value.

According to an embodiment, information about the transmission of low-latency traffic may include information about a link to be allocated for the transmission of low-latency traffic of the multi-link. In other words, the receiving STA may request information about a link to be allocated for low-latency traffic transmission from the transmitting STA. For example, the receiving STA may request information about a link to be allocated for transmission of low-latency traffic among the first link and the second link to the transmitting STA.

According to an embodiment, the receiving STA may exchange information about a link to be allocated for transmission of low-latency traffic among multi-link with the transmitting STA. For example, the receiving STA may receive information about the multi-link in which the current BSS operates from the transmitting STA. The receiving STA may recommend a link to be allocated for transmission of low-latency traffic among the multi-link, based on the information on the multi-link. For example, the receiving STA may recommend a first link among the first link and the second link as a link to be allocated for transmission of low-latency traffic. The receiving STA may recommend the first link to the transmitting STA as a link to be allocated for transmission of low-latency traffic. In other words, the receiving STA may transmit information about a preferred link to the transmitting STA as a link to be allocated for transmission of low-latency traffic.

According to an embodiment, the receiving STA may transmit, before requesting information about the transmission of low-latency traffic, capability information on whether to support low-latency traffic to the transmitting STA. "Capability information on whether to support link indication information for transmission of low-latency traffic" may mean information about whether link indication information for transmission of low-latency traffic can be reported to the AP according to the example described above. Capability information on whether to support low-latency traffic may be transmitted through a beacon, a probe request, a probe response, an association request, an association response, other management frames, other control frames, or the like.

According to an embodiment, the receiving STA may transmit "capability information on whether to support link indication information for transmission of low-latency traffic" to the transmitting STA before requesting information about the transmission of low-latency traffic. "Capability information on whether to support link indication information for transmission of low-latency traffic" may be transmitted through a beacon, a probe request, a probe response, an association request, an association response, other management frames, other control frames, or the like.

In step S2720, the receiving STA may receive information about the first link from the transmitting STA. According to an embodiment, the information about the first link may include information indicating that the first link is assigned/determined/selected as a link for the transmission of low-latency traffic. According to an embodiment, the information about the first link may further include information that exchange of a management frame for the first link is prohibited.

In step S2730, the receiving STA may transmit a first frame including low-latency traffic to the transmitting STA through the first link. According to an embodiment, the receiving STA may transmit a first frame including low-latency traffic to the transmitting STA through the first link, based on the first parameter set for low-latency traffic. For example, the receiving STA may perform channel access based on the first parameter set. The receiving STA may transmit the first frame through the first link based on the channel access.

According to an embodiment, the receiving STA may transmit a second frame including traffic distinguished from low-latency traffic through the second link. For example, the receiving STA may transmit the second frame over the second link based on a second parameter set that is distinct from the first parameter set. For example, traffic that is distinguished from low-latency traffic may include normal traffic other than low-latency traffic.

For example, the first parameter set and/or the second parameter set may be associated with an access category. As an example, the first parameter set may include information on channel access parameters related to AC_BK (background), AC_BE (best effort), AC_VI (video), and/or AC_VO (voice). Channel access parameters may include AIFS, CWmin, CWmax and/or TXOP limit.

As an example, the first parameter set may include AIFS, CWmin, CWmax, and/or TXOP limit parameter information related to AC_BK. As another example, the first parameter set may include AIFS, CWmin, CWmax, and/or TXOP limit parameter information related to AC_BE. As another example, the first parameter set may include AIFS, CWmin, CWmax, and/or TXOP limit parameter information related to AC_VI. As another example, the first parameter set may include AIFS, CWmin, CWmax, and/or TXOP limit parameter information related to AC_VO.

For example, the first parameter set may include an Enhanced Distributed Channel Access (EDCA) parameter. For example, the second parameter set may include a Multi-User Enhanced Distributed Channel Access (MU EDCA) parameter.

According to an embodiment, the first link may be configured to prohibit the exchange of management frames for the first link. Accordingly, the receiving STA may transmit the management frame for the first link through the second link. The receiving STA may receive the management frame for the first link through the second link.

According to an embodiment, the receiving STA may receive a trigger frame for transmission of low-latency traffic from the transmitting STA. The trigger frame may include information about the allocated resource for the transmission of low-latency traffic. The receiving STA may transmit low-latency traffic based on the allocated resource for the transmission of low-latency traffic.

Some of the steps described above may not be essential. Accordingly, some steps may be omitted. In addition, since the order of the above-described steps is an example, the order of performing each step may vary. In addition, only one of the above-described steps may have an independent technical meaning.

Figure 28:
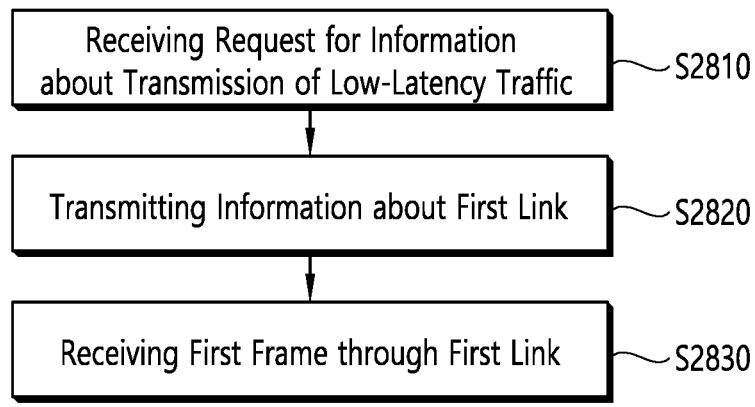
FIG. 28 is a flowchart illustrating an operation of a transmitting STA according to various embodiments of the present disclosure.

FIG. 28 is a flowchart illustrating an operation of a transmitting STA according to various embodiments of the present disclosure.

Referring to FIG. 28, in step S2810, the transmitting STA may receive a request for information about the transmission of low-latency traffic from the receiving STA.

According to an embodiment, the receiving STA and the transmitting STA may support a multi-link including a first link and a second link. For example, the receiving STA and the transmitting STA may transmit/receive data through the first link and the second link. Also, the first link and the second link may operate independently of each other. For example, the transmitting STA may receive uplink data through the second link while transmitting downlink data through the first link.

According to an embodiment, the low-latency traffic may include traffic requiring a time delay less than or equal to a threshold.

According to an embodiment, information about the transmission of low-latency traffic may include information about the link to be allocated for the transmission of low-latency traffic among the multi-link. In other words, the transmitting STA may receive from the receiving STA a request for information about a link to be allocated for low-latency traffic transmission. For example, the transmitting STA may receive a request for information about a link to be allocated for transmission of low-latency traffic among the first link and the second link from the receiving STA.

According to an embodiment, the transmitting STA may exchange information about a link to be allocated for transmission of low-latency traffic among multi-link with the receiving STA. For example, the transmitting STA may transmit information about the multi-link in which the current BSS operates to the receiving STA. The transmitting STA may receive information about a preferred link as a link to be allocated for transmission of low-latency traffic from the receiving STA.

According to an embodiment, the transmitting STA may transmit, before receiving a request for information on the transmission of low-latency traffic, capability information on whether to support low-latency traffic to the receiving STA. Capability information on whether to support low-latency traffic may be transmitted through a beacon, a probe request, a probe response, an association request, an association response, other management frames, other control frames, or the like.

According to an embodiment, the transmitting STA may transmit "capability information on whether to support link indication information for the transmission of low-latency traffic" to the receiving STA, before receiving a request for information on the transmission of low-latency traffic. "Capability information on whether to support link indication information for transmission of low-latency traffic" may be transmitted through a beacon, a probe request, a probe response, an association request, an association response, other management frames, other control frames, and the like.

In step S2820, the transmitting STA may transmit information about the first link to the receiving STA. According to an embodiment, the information about the first link may include information indicating that the first link is assigned/determined/selected as a link for the transmission of low-latency traffic.

For example, the transmitting STA may determine/select a link to be allocated for the reception of low-latency traffic, based on the information about the multi-link in which the BSS operates. As an example, when the second link is congested, the transmitting STA may determine/select the first link among the first link and the second link as a link for transmission of low-latency traffic.

For example, the information about the first link may further include information that exchange of a management frame for the first link is prohibited.

In step S2830, the transmitting STA may receive a first frame including low-latency traffic from the receiving STA through the first link.

According to an embodiment, the transmitting STA may receive a first frame including low-latency traffic from the receiving STA through a first link, based on a first parameter set for low-latency traffic. For example, the receiving STA may perform channel access based on the first parameter set. The receiving STA may transmit the first frame through the first link based on the channel access. Accordingly, the transmitting STA may receive the first frame from the receiving STA through the first link.

According to an embodiment, the transmitting STA may receive a second frame including traffic distinguished from low-latency traffic through the second link. For example, the transmitting STA may receive the second frame over the second link based on a second parameter set that is distinct from the first parameter set. For example, traffic that is distinguished from low-latency traffic may include normal traffic other than low-latency traffic.

For example, the first parameter set and/or the second parameter set may be associated with an access category. As an example, the first parameter set may include information on channel access parameters related to AC_BK (background), AC_BE (best effort), AC_VI (video), and/or AC_VO (voice). Channel access parameters may include AIFS, CWmin, CWmax and/or TXOP limit.

As an example, the first parameter set may include AIFS, CWmin, CWmax, and/or TXOP limit parameter information related to AC_BK. As another example, the first parameter set may include AIFS, CWmin, CWmax, and/or TXOP limit parameter information related to AC_BE. As another example, the first parameter set may include AIFS, CWmin, CWmax, and/or TXOP limit parameter information related to AC_VI. As another example, the first parameter set may include AIFS, CWmin, CWmax, and/or TXOP limit parameter information related to AC_VO.

For example, the first parameter set may include an Enhanced Distributed Channel Access (EDCA) parameter. For example, the second parameter set may include a Multi-User Enhanced Distributed Channel Access (MU EDCA) parameter.

According to an embodiment, the first link may be configured to prohibit the exchange of management frames for the first link. Accordingly, the transmitting STA may receive the management frame for the first link through the second link. The transmitting STA may transmit a management frame for the first link through the second link.

According to an embodiment, the transmitting STA may transmit a trigger frame for transmission of low-latency traffic to the receiving STA. The trigger frame may include information about the allocated resource for the transmission of low-latency traffic. The transmitting STA may receive low-latency traffic based on the allocated resource for the transmission of low-latency traffic.

Some of the steps described above may not be essential. Accordingly, some steps may be omitted. In addition, since the order of the above-described steps is an example, the order of performing each step may vary. In addition, only one of the above-described steps may have an independent technical meaning.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the apparatus of the present disclosure includes a processor and a memory coupled to the processor. The processor may be configured to request, to a transmitting STA, information on transmission of low-latency traffic, wherein the low-latency traffic includes traffic requiring a time latency less than or equal to a threshold value; receive, from the transmitting STA, information on a first link, wherein the information on the first link includes information informing that the first link is assigned as a link for the transmission of the low-latency traffic; and transmit, to the transmitting STA, a first frame including the low-latency traffic through the first link, based on a first parameter set for the low-latency traffic.

The technical features of the present disclosure may be implemented based on a computer readable medium (CRM). For example, a CRM proposed by the present disclosure may store instructions which perform operations including the steps of requesting, to a transmitting STA, information on transmission of low-latency traffic, wherein the low-latency traffic includes traffic requiring a time latency less than or equal to a threshold value; receiving, from the transmitting STA, information on a first link, wherein the information on the first link includes information informing that the first link is assigned as a link for the transmission of the low-latency traffic; and transmitting, to the transmitting STA, a first frame including the low-latency traffic through the first link, based on a first parameter set for the low-latency traffic. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WAN) system, the method comprising:
    obtaining, by a first station (STA), first information including a Multi-User (MU) Enhanced Distributed Channel Access (EDCA) parameter set which is related to an Uplink (UL) MU transmission of the first STA;
    transmitting, by the first STA, an Association Request frame to a second STA, wherein the Association Request frame includes first capability information related to whether the first STA supports priority access related to communicating traffic with a higher priority;
    receiving, by the first STA, an Association Response frame from the second STA, wherein the Association Response frame includes second capability information related to whether the second STA supports the priority access;
    transmitting, by the first STA, a request signal related to the priority access to the second STA;
    based on the request signal, receiving, by the first STA, a response signal related to priority access from the second STA, wherein the response signal includes first information identifying a link related to the priority access and second information containing a parameter used for the priority access on the link; and
    managing, by the first STA, an EDCA parameter of the first STA based on the priority access, wherein the first STA ignores updating the EDCA parameter based on the MU EDCA parameter set and updates the EDCA parameter based on an EDCA parameter set used for the priority access while the priority access is enabled.

2. The method of claim 1, wherein the EDCA parameter set used for the priority access is set lower than the MU EDCA parameter set, and the EDCA parameter set used for the priority access includes a Contention Window Min (CWmin) value and a Contention Window Max (CWmax) value.

3. The method of claim 1, wherein the higher priority is related to a low-latency transmission.

4. The method of claim 1, wherein the second information carries information allocating radio resources used for the UL MU transmission of the first STA.

5. The method of claim, 1, wherein the UL MU transmission of the first STA is triggered by a Trigger Frame transmitted by the second STA.

6. A first station (STA) in a wireless local area network (LAN) system, the first STA comprising:
    at least one processor; and
    at least one computer memory operably connectable to the at least one processor and storing instructions that, based on being executed by the at least one processor, perform operations comprising:
    obtaining first information including a Multi-User (MU) Enhanced Distributed Channel Access (EDCA) parameter set which is related to an Uplink (UL) MU transmission of the first STA;
    transmitting an Association Request frame to a second STA, wherein the Association Request frame includes first capability information related to whether the first STA supports priority access related to communicating traffic with a higher priority;
    receiving an Association Response frame from the second STA, wherein the Association Response frame includes second capability information related to whether the second STA supports the priority access;
    transmitting a request signal related to the priority access to the second STA;
    based on the request signal, receiving a response signal related to priority access from the second STA, wherein the response signal includes first information identifying a link related to the priority access and second information containing a parameter used for the priority access on the link; and
    managing an EDCA parameter of the first STA based on the priority access, wherein the first STA ignores updating the EDCA parameter based on the MU EDCA parameter set and updates the EDCA parameter based on an EDCA parameter set used for the priority access while the priority access is enabled.

7. The first STA of claim 6, wherein the EDCA parameter set used for the priority access is set lower than the MU EDCA parameter set, and the EDCA parameter set used for the priority access includes a Contention Window Min (CWmin) value and a Contention Window Max (CWmax) value.

8. The first STA of claim 6, wherein the higher priority is related to a low-latency transmission.

9. The first STA of claim 6, wherein the second information carries information allocating radio resources used for the UL MU transmission of the first STA.

10. The first STA of claim, 6, wherein the UL MU transmission of the first STA is triggered by a Trigger Frame transmitted by the second STA.

* * * * *